United States Patent
Miller

(10) Patent No.: US 12,433,738 B2
(45) Date of Patent: Oct. 7, 2025

(54) TENDON SURGERY NAIL KNOT SYSTEMS AND METHODS

(71) Applicant: Drew Miller, Atlanta, GA (US)

(72) Inventor: Drew Miller, Atlanta, GA (US)

( * ) Notice: Subject to any disclaimer, the term of this patent is extended or adjusted under 35 U.S.C. 154(b) by 616 days.

(21) Appl. No.: 17/701,196

(22) Filed: Mar. 22, 2022

(65) Prior Publication Data

US 2022/0296358 A1     Sep. 22, 2022

Related U.S. Application Data

(60) Provisional application No. 63/164,072, filed on Mar. 22, 2021.

(51) Int. Cl.
*A61F 2/08*     (2006.01)
*A61B 17/04*    (2006.01)

(52) U.S. Cl.
CPC ........ *A61F 2/0811* (2013.01); *A61B 17/0469* (2013.01); *A61B 2017/0474* (2013.01); *A61F 2002/0829* (2013.01); *A61F 2002/0852* (2013.01); *A61F 2002/0888* (2013.01)

(58) Field of Classification Search
CPC ........ A61B 17/0469; A61B 2017/0474; A61B 17/0482; A61B 17/12009; A61B 2017/0475; A61B 2017/0477; A61F 2/0811; A61F 2002/0829; A61F 2002/0888
See application file for complete search history.

(56) References Cited

U.S. PATENT DOCUMENTS

| | | | |
|---|---|---|---|
| 1,532,110 | A | 3/1925 | Loy |
| 2,334,837 | A | 11/1943 | Ira et al. |
| 3,738,692 | A | 6/1973 | Schimdt |
| 3,831,309 | A | 8/1974 | Martuch |
| 5,020,833 | A | 6/1991 | Wardall |
| 5,098,137 | A | 3/1992 | Wardall |
| 5,240,295 | A | 8/1993 | Spencer |

(Continued)

FOREIGN PATENT DOCUMENTS

| | | | |
|---|---|---|---|
| AU | 2014201525 A1 | | 10/2014 |
| JP | 2018516732 A | * | 6/2018 |
| WO | 2013066974 A1 | | 5/2013 |

OTHER PUBLICATIONS

Translation of JP-2018516732-A1 (Year: 2018).*
Translated Written Description of JP 2018516732 with paragraph numbers (Year: 2018).*

*Primary Examiner* — Melanie R Tyson
*Assistant Examiner* — Paris Marie Blass
(74) *Attorney, Agent, or Firm* — Acuity IP, LLC; Nathan S. Cassell

(57) ABSTRACT

Exemplary systems and methods encompass suture knot tools and suture knot tools pre-loaded with sutures for use in tendon repair and other surgical procedures. Related methods may include forming a nail knot between a suture and a tissue of a patient during a surgical procedure by drawing tissue into a port sleeve of an arthroscopic system, moving the port sleeve relative to a free end portion of the tissue and a nail knot cinch of a suture, to allow the nail knot cinch of the suture to contact the free end portion of the tissue; and tightening the nail knot cinch of the suture about the free end portion of the tissue, so as to form the nail knot with the suture and the tissue.

9 Claims, 30 Drawing Sheets

(56) References Cited

U.S. PATENT DOCUMENTS

| | | | |
|---|---|---|---|
| 5,557,874 A | 9/1996 | Pietrandrea et al. | |
| 5,562,684 A * | 10/1996 | Kammerer | A61B 17/0401 |
| | | | 606/139 |
| 5,593,189 A | 1/1997 | Little | |
| 5,643,293 A * | 7/1997 | Kogasaka | A61B 17/0469 |
| | | | 606/139 |
| 5,829,798 A | 11/1998 | Little | |
| 5,896,800 A | 4/1999 | Curtsinger et al. | |
| 5,971,447 A | 10/1999 | Steck, III | |
| 6,065,370 A | 5/2000 | Curtsinger et al. | |
| 6,460,226 B1 | 10/2002 | Smith et al. | |
| 6,551,330 B1 * | 4/2003 | Bain | A61B 17/0469 |
| | | | 606/144 |
| 6,569,188 B2 | 5/2003 | Grafton et al. | |
| 6,880,289 B1 | 4/2005 | Yin | |
| 6,910,296 B2 | 6/2005 | Blette et al. | |
| 7,083,638 B2 | 8/2006 | Foerster | |
| 7,494,162 B1 | 2/2009 | Howell | |
| 7,666,196 B1 | 2/2010 | Miles | |
| 7,861,457 B2 | 1/2011 | Blette et al. | |
| 7,959,650 B2 | 6/2011 | Kaiser et al. | |
| 7,997,629 B2 | 8/2011 | High | |
| 8,118,836 B2 | 2/2012 | Denham et al. | |
| 8,495,964 B1 | 7/2013 | Ronald | |
| 8,511,721 B1 | 8/2013 | Farner et al. | |
| 8,551,140 B2 | 10/2013 | Denham et al. | |
| 8,574,275 B2 | 11/2013 | Stone et al. | |
| 8,652,171 B2 | 2/2014 | Stone et al. | |
| 8,688,232 B2 | 4/2014 | Finley et al. | |
| 8,834,542 B2 | 9/2014 | Mayer et al. | |
| 8,886,303 B1 | 11/2014 | Swoyer et al. | |
| 8,920,441 B2 | 12/2014 | Saliman | |
| 9,226,817 B2 | 1/2016 | Dougherty et al. | |
| 9,277,951 B1 | 3/2016 | Hovis | |
| 9,370,350 B2 | 6/2016 | Norton | |
| 9,492,158 B2 | 11/2016 | Stone et al. | |
| 9,517,062 B2 | 12/2016 | Santangelo et al. | |
| 9,706,984 B2 | 7/2017 | Heaven et al. | |
| 9,743,652 B2 | 8/2017 | Hodges | |
| 9,801,621 B2 | 10/2017 | Benavitz | |
| 9,829,278 B2 | 11/2017 | Wolf et al. | |
| 10,039,543 B2 | 8/2018 | Durando | |
| 10,092,288 B2 | 10/2018 | Denham et al. | |
| 2002/0029066 A1 | 3/2002 | Foerster | |
| 2002/0032466 A1 | 3/2002 | Grafton et al. | |
| 2002/0108294 A1 | 8/2002 | Denby | |
| 2003/0023268 A1 | 1/2003 | Lizardi | |
| 2005/0028426 A1 | 2/2005 | Blette et al. | |
| 2005/0034356 A1 | 2/2005 | Blette et al. | |
| 2005/0234460 A1 | 10/2005 | Miller | |
| 2005/0278865 A1 | 12/2005 | West | |
| 2006/0074434 A1 | 4/2006 | Wenstrom et al. | |
| 2006/0155287 A1 | 7/2006 | Montgomery et al. | |
| 2006/0178702 A1 | 8/2006 | Pierce et al. | |
| 2006/0253127 A1 * | 11/2006 | Bjerken | A61B 17/0482 |
| | | | 606/139 |
| 2007/0173887 A1 | 7/2007 | Sasaki | |
| 2008/0091219 A1 * | 4/2008 | Marshall | A61B 17/0469 |
| | | | 606/144 |
| 2008/0140118 A1 * | 6/2008 | Martinek | A61B 17/0401 |
| | | | 606/232 |
| 2008/0255613 A1 | 10/2008 | Kaiser et al. | |
| 2009/0012538 A1 | 1/2009 | Saliman et al. | |
| 2009/0119973 A1 | 5/2009 | Moffitt | |
| 2009/0138029 A1 | 5/2009 | Saliman et al. | |
| 2009/0165767 A1 | 7/2009 | Parrish et al. | |
| 2009/0177229 A1 | 7/2009 | Gulotta et al. | |
| 2009/0192608 A1 | 7/2009 | Paulos | |
| 2009/0222040 A1 | 9/2009 | Foerster | |
| 2010/0042117 A1 * | 2/2010 | Kim | A61B 17/0469 |
| | | | 606/148 |
| 2010/0089301 A1 | 4/2010 | Kubli | |
| 2010/0130990 A1 | 5/2010 | Saliman | |
| 2010/0228254 A1 | 9/2010 | Pandya | |
| 2011/0087326 A1 | 4/2011 | Paulos | |
| 2011/0112550 A1 | 5/2011 | Heaven et al. | |
| 2011/0112558 A1 | 5/2011 | Whayne et al. | |
| 2011/0130773 A1 | 6/2011 | Saliman et al. | |
| 2012/0059417 A1 | 3/2012 | Norton et al. | |
| 2012/0116450 A1 * | 5/2012 | McDevitt | A61B 17/0401 |
| | | | 606/232 |
| 2012/0123473 A1 | 5/2012 | Hernandez | |
| 2012/0150223 A1 | 6/2012 | Manos et al. | |
| 2012/0165866 A1 | 6/2012 | Kaiser et al. | |
| 2012/0232627 A1 * | 9/2012 | Swoyer | A61N 1/0558 |
| | | | 607/116 |
| 2013/0035722 A1 * | 2/2013 | McDevitt | A61B 17/1796 |
| | | | 606/232 |
| 2013/0081292 A1 | 4/2013 | Lorocco | |
| 2013/0123810 A1 | 5/2013 | Brown et al. | |
| 2013/0190819 A1 | 7/2013 | Norton | |
| 2014/0046369 A1 | 2/2014 | Heaven et al. | |
| 2014/0081365 A1 | 3/2014 | Kane et al. | |
| 2014/0121455 A1 | 5/2014 | Moschel | |
| 2014/0121700 A1 | 5/2014 | Dreyfuss et al. | |
| 2014/0228822 A1 | 8/2014 | Trajkovic et al. | |
| 2014/0249579 A1 | 9/2014 | Heaven et al. | |
| 2014/0277133 A1 | 9/2014 | Foerster | |
| 2014/0343604 A1 | 11/2014 | Frank | |
| 2015/0018881 A1 | 1/2015 | Cauldwell et al. | |
| 2015/0051621 A1 | 2/2015 | Sorensen et al. | |
| 2015/0051644 A1 | 2/2015 | Holmes, Jr. | |
| 2015/0127048 A1 | 5/2015 | Curtis et al. | |
| 2015/0164497 A1 | 6/2015 | Callison et al. | |
| 2015/0173739 A1 | 6/2015 | Rodriguez et al. | |
| 2015/0190135 A1 | 7/2015 | Ibrahim et al. | |
| 2015/0196384 A1 | 7/2015 | Niu et al. | |
| 2015/0216542 A1 | 8/2015 | Libby et al. | |
| 2015/0245831 A1 | 9/2015 | Sullivan | |
| 2015/0264908 A1 | 9/2015 | Banda | |
| 2015/0266177 A1 | 9/2015 | Conklin | |
| 2016/0030159 A1 | 2/2016 | Ticker | |
| 2016/0113643 A1 | 4/2016 | Diduch et al. | |
| 2016/0113644 A1 | 4/2016 | Diduch et al. | |
| 2016/0113756 A1 | 4/2016 | Diduch et al. | |
| 2016/0113757 A1 | 4/2016 | Diduch et al. | |
| 2016/0113758 A1 | 4/2016 | Diduch et al. | |
| 2016/0213369 A1 | 7/2016 | Stone et al. | |
| 2016/0296319 A1 | 10/2016 | Lopez | |
| 2016/0317141 A1 | 11/2016 | Mayer et al. | |
| 2016/0331366 A1 | 11/2016 | Widmer | |
| 2016/0338688 A1 | 11/2016 | Nason et al. | |
| 2017/0035411 A1 | 2/2017 | Kaiser et al. | |
| 2017/0049558 A1 | 2/2017 | Santangelo et al. | |
| 2017/0071593 A1 | 3/2017 | Stone et al. | |
| 2017/0095324 A1 | 4/2017 | Adams et al. | |
| 2017/0112511 A1 | 4/2017 | Fallin et al. | |
| 2017/0150963 A1 | 6/2017 | Coleman | |
| 2017/0367692 A1 * | 12/2017 | Deem | A61B 17/0466 |
| 2018/0042598 A1 | 2/2018 | Mayer et al. | |
| 2018/0049863 A1 | 2/2018 | Gregoire et al. | |
| 2018/0085112 A1 | 3/2018 | Sorensen et al. | |
| 2018/0087874 A1 | 3/2018 | Wolf et al. | |
| 2018/0146727 A1 | 5/2018 | Hewlett | |
| 2018/0206977 A1 | 7/2018 | Park et al. | |
| 2018/0228597 A1 | 8/2018 | McCarty, III | |
| 2018/0263755 A1 | 9/2018 | Adams et al. | |
| 2018/0360438 A1 | 12/2018 | Curtis et al. | |
| 2019/0374330 A1 | 12/2019 | Beaulier et al. | |
| 2020/0054439 A1 | 2/2020 | Holowecky et al. | |
| 2020/0178959 A1 | 6/2020 | Denham et al. | |
| 2020/0281580 A1 | 9/2020 | Kruse et al. | |
| 2022/0240918 A1 * | 8/2022 | Qi | A61B 17/0401 |

* cited by examiner

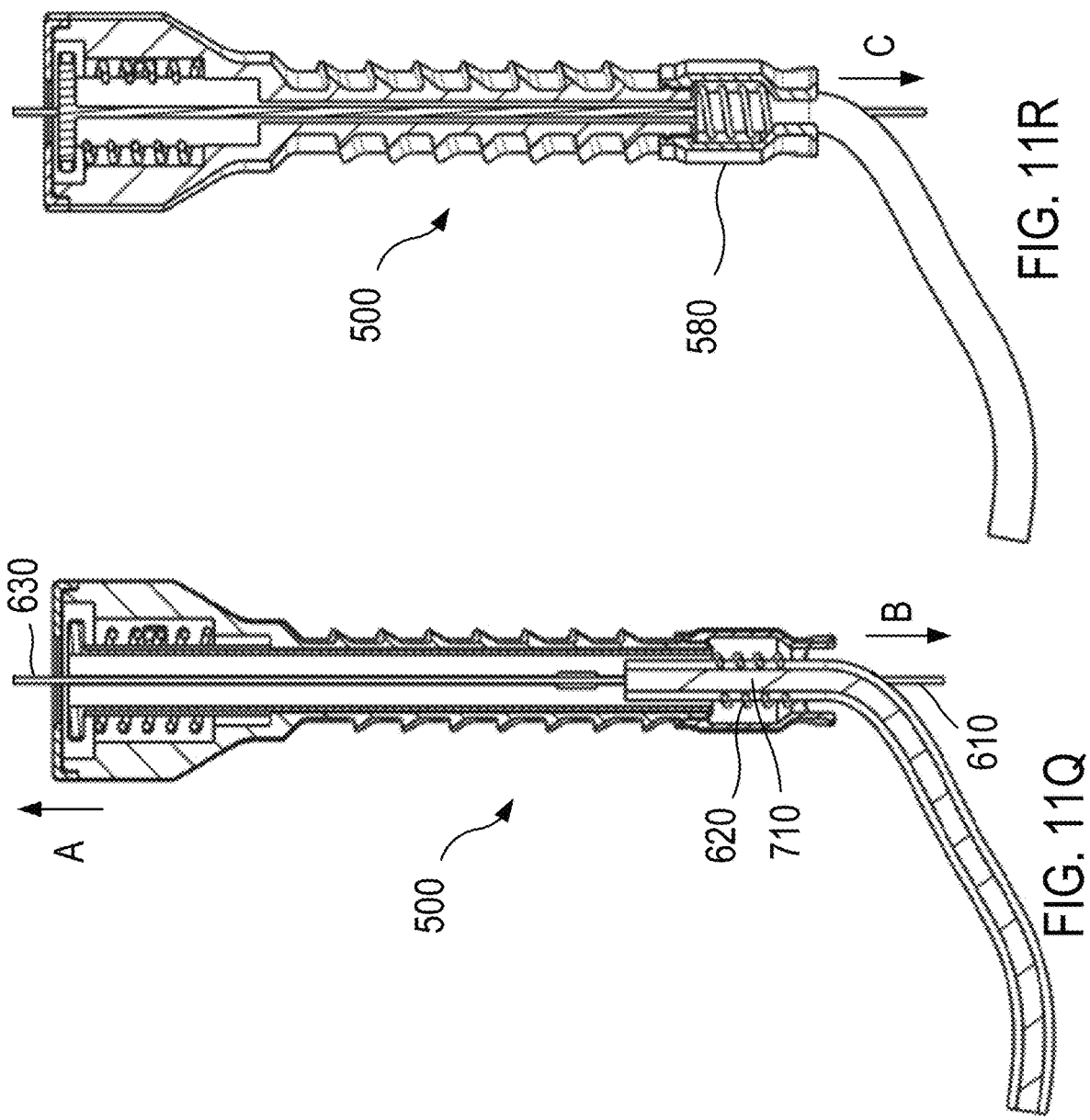

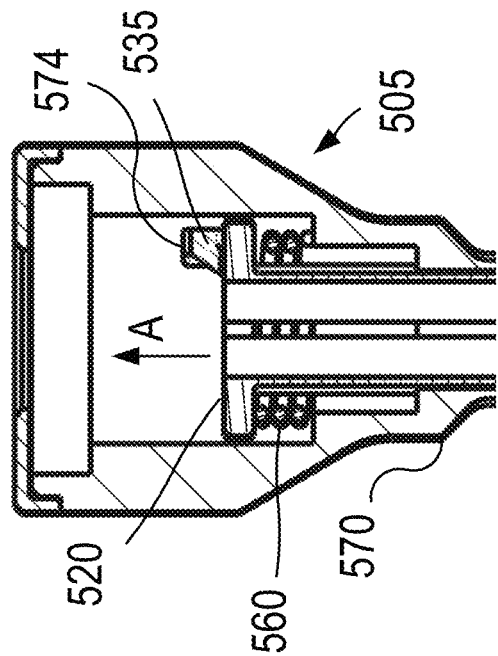
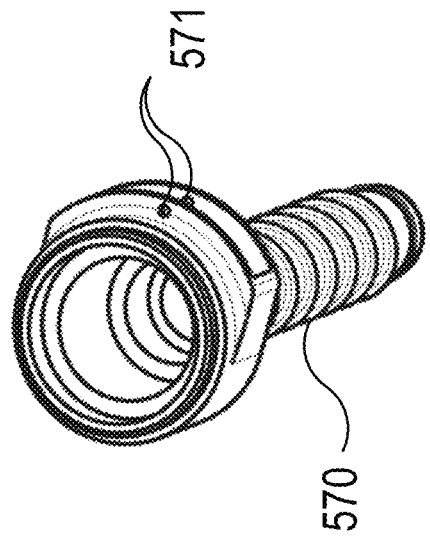
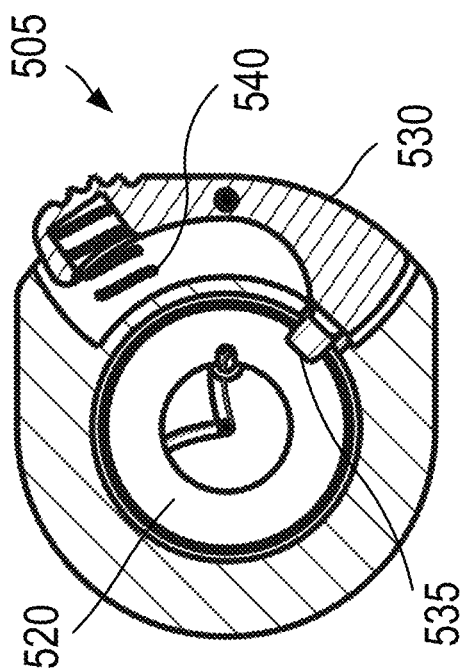
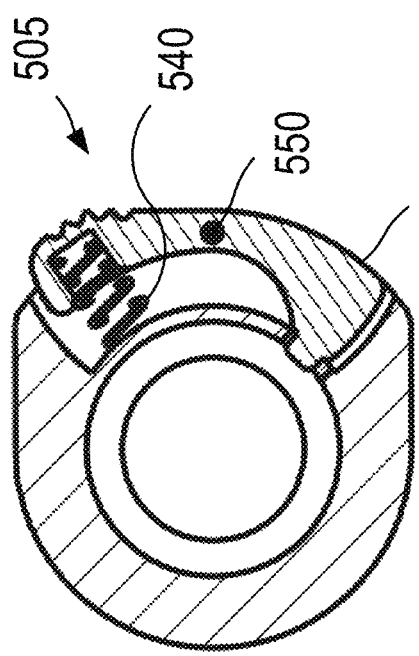

TENDON SURGERY NAIL KNOT SYSTEMS AND METHODS

CROSS-REFERENCES TO RELATED APPLICATIONS

This application claims the benefit of U.S. Provisional Patent Application No. 63/164,072 filed Mar. 22, 2021, the disclosure of which is incorporated herein by reference.

BACKGROUND OF THE INVENTION

Embodiments of the present invention relate generally to surgical techniques, and in particular encompass knot systems and methods for tendon surgery.

BRIEF SUMMARY OF THE INVENTION

Tendon repair systems and methods which involve the formation of a knot between a suture and a portion of a tendon are disclosed here. Exemplary knot embodiments include nail knots, friction knots, and other knots that can be used to join two elements (i.e. suture and tendon) of different diameters.

In some aspects, embodiments of the present invention encompass suture knot tools and systems or mechanisms pre-loaded or prepackaged with a suture, for forming a knot with a tendon. In some cases, the pre-loaded or pre-packaged device may include a nail knot cinch, for coupling with a tendon as a nail knot post, so as to form a nail knot.

In another aspect, embodiments of the present invention encompass systems and methods for forming a nail knot between a suture and a fibrous connective tissue of a patient, for example during an arthroscopic procedure. Exemplary methods can include drawing a free end portion of the fibrous connective tissue into a port sleeve of an arthroscopic system so that the free end portion of the fibrous connective tissue is disposed within the port sleeve, where a nail knot cinch of the suture is disposed external to the port sleeve. Methods can also include moving the port sleeve relative to the free end portion of the fibrous connective tissue and the nail knot cinch of the suture, to allow the nail knot cinch of the suture to contact the free end portion of the fibrous connective tissue. Methods can also include tightening the nail knot cinch of the suture about the free end portion of the fibrous connective tissue, so as to form the nail knot with the suture and the fibrous connective tissue. In some cases, the step of tightening the nail knot cinch of the suture about the free end portion of the fibrous connective tissue includes pulling a proximal portion of the nail knot cinch in a proximal direction relative to a central loop of the nail knot cinch. In some cases, the step of tightening the nail knot cinch of the suture about the free end portion of the fibrous connective tissue further includes pulling a distal portion of the nail knot cinch in a distal direction relative to a central loop of the nail knot cinch. In some cases, the port sleeve is disposed at least partially within a joint space of the patient.

In some embodiments, at least a portion of the port sleeve is disposed within a port and a suture cap is disposed about the nail knot cinch, when the port sleeve is moved relative to the free end portion of the fibrous connective tissue and the nail knot cinch of the suture. In some cases, the fibrous connective tissue is a diseased fibrous connective tissue or a damaged fibrous connective tissue. In some cases, the fibrous connective tissue is either a tendon or a ligament. In some cases, the fibrous connective tissue includes a tendon. In some cases, the fibrous connective tissue includes a ligament.

In another aspect, embodiments of the present invention encompass a pre-loaded arthroscopic assembly for forming a nail knot between a suture and a fibrous connective tissue of a patient during an arthroscopic procedure. An exemplary assembly can include a port sleeve, a suture, a port, and a releasable locking mechanism. In some cases, the port sleeve has a proximal portion and a distal portion. In some cases, the suture has a proximal portion, a distal portion, and a coil wrapped about the distal portion of the port sleeve. In some cases, the suture is configured as a nail knot cinch. In some cases, the port is configured to at least partially receive the port sleeve. In some cases, the releasable locking mechanism is configured to hold the port sleeve in fixed relationship with the port when locked, and to allow the port sleeve to advance proximally relative to the port when unlocked. In some cases, the locking mechanism includes a lever pin, a lever that pivots about the lever pin, a lever stop that can prevent the port sleeve from moving proximally relative to the port, and a lever spring. In some cases, a pre-loaded arthroscopic assembly can include a release spring that compresses when the port sleeve is advanced distally relative to the port. In some cases, a pre-loaded arthroscopic assembly can include a suture cap that covers the suture coil. In some cases, the port can include an external spiral thread. In some cases, the port can include an aperture that is configured to receive a lever stop of the locking mechanism.

In another aspect, embodiments of the present invention encompass a pre-loaded assembly for forming a nail knot between a suture and a tissue of a patient during a surgical procedure. Exemplary assemblies can include a suture knot tool that receives the tissue, and a suture configured as a nail knot cinch. The suture can have a proximal portion, a distal portion, and a central coil portion, and the central coil portion can be wrapped about the suture knot tool. In some cases, the suture knot tool is provided as a tube that is configured to receive the tissue. In some cases, the assembly can further include the tube, and a distal portion of the suture can be disposed within the tube. In some cases, the assembly can further include the tube, and a proximal portion of the suture can be disposed within the tube. In some cases, the assembly can further include a first tube and a second tube, where a proximal portion of the suture is disposed within the first tube and a distal portion of the suture is disposed within the second tube.

These and other embodiments are described in further detail in the following description related to the appended drawing figures.

BRIEF DESCRIPTION OF THE DRAWINGS

Specific embodiments of the disclosed devices, systems, or methods will now be described with reference to the drawings. Nothing in this detailed description is intended to imply that any particular component, feature, or step is essential to the invention.

FIGS. 12A to 12D depict aspects of a locking mechanism for an arthroscopic system, in accordance with some embodiments.

DETAILED DESCRIPTION OF THE INVENTION

Currently available surgical suture systems involve complicated designs with multiple moving parts and complex knot or threading/weaving configurations. For example, whipstitch techniques are often used in anterior cruciate ligament (ACL) and bicep tendon repair, and this approach involves a significant amount of time and effort on the part of the surgeon. Advantageously, innovative embodiments disclosed herein involve unique designs that are easy to use and manufacture, and enable a suture to gain strong purchase or grip on a tendon or other anatomical tissue. The suture knot configurations disclosed herein can provide extremely high pull out strengths. Exemplary systems and methods provide techniques for deploying a nail knot or other suture knot about a tendon.

Figure 1:
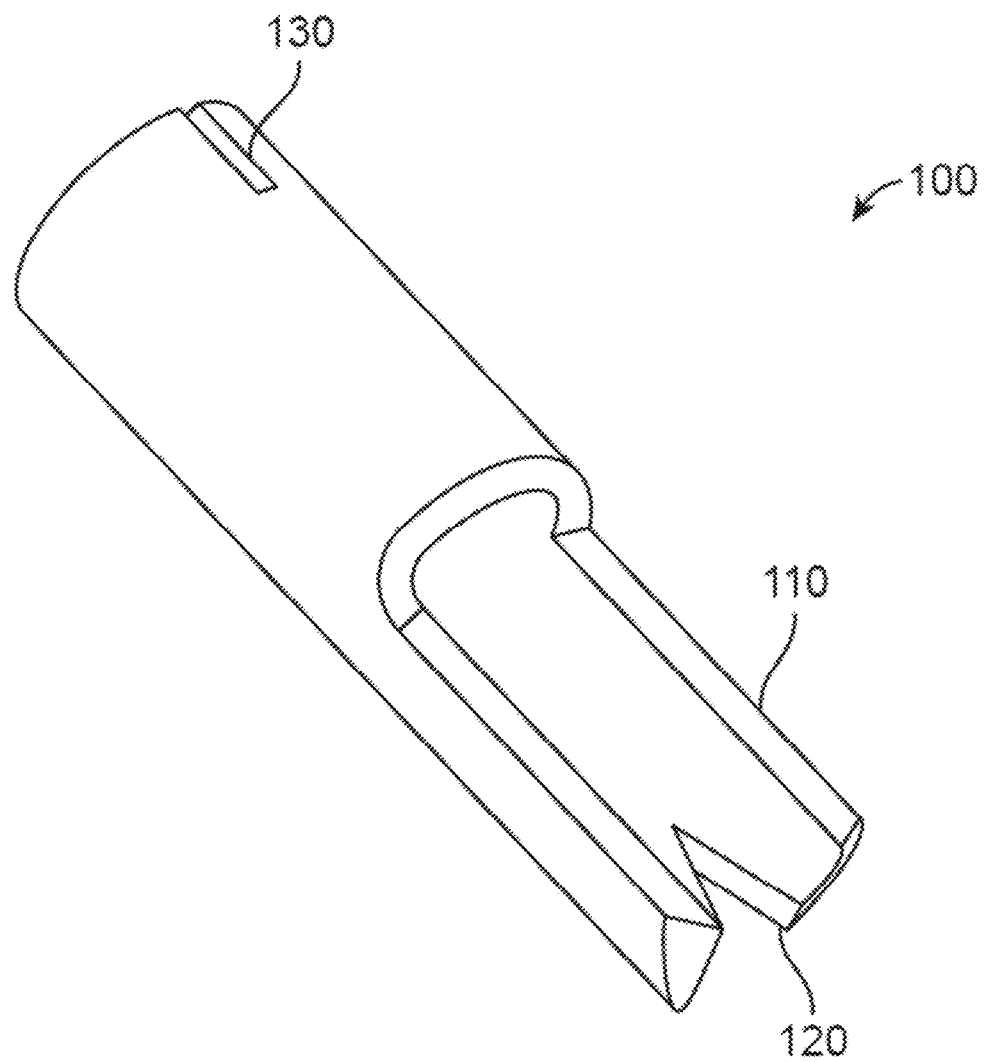
FIG. 1 depicts aspects of a suture knot tool, in accordance with some embodiments.

Turning now to the drawings, FIG. 1 depicts aspects of a suture knot tool 100, according to embodiments of the present invention. As shown here, the suture knot tool 100 includes a generally tubular structure having at one end a cut-out 110 on an upper portion or first side and a notch 120 on a lower portion or second side. The other end of the suture knot tool 100 has a slot 130. A tool 100 could be manufactured from a variety of materials, in a variety of sizes (e.g. various lengths and/or diameters). In some cases, one or more features of suture knot tool 100 can be used as a part of, or incorporated into, an arthroscopic system as disclosed elsewhere herein.

Figure 2:
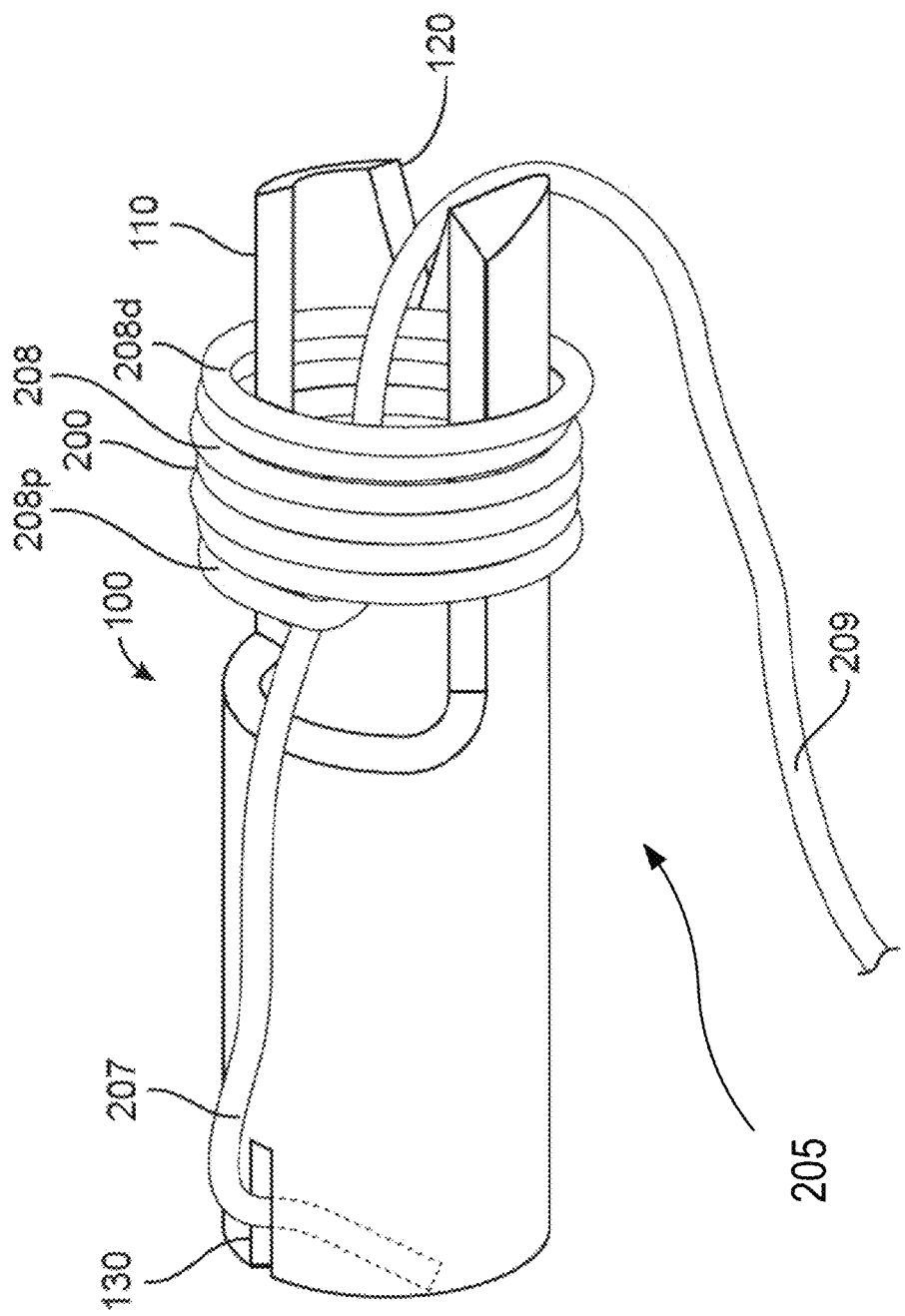
FIG. 2 illustrates aspects of suture knot tool loaded with a suture, in accordance with some embodiments.

FIG. 2 illustrates a suture knot tool 100 and a suture 200, where the suture 200 is loaded on the suture knot tool 100. Such pre-loaded or pre-packaged configurations can be provided with various sizes of suture knot tools and/or various sizes or diameters of sutures. In this way, the appropriate pre-loaded configuration can be selected, for example by the surgeon, for use with a particular type of tendon or biological tissue. For example, a larger version could be selected for use with an Achilles tendon or bicep tendon (e.g. tool having 8 mm-10 mm opening or inner diameter), and a small version could be selected for use with a tendon of a finger (e.g. tool having 5 mm opening or inner diameter). Once a pre-loaded or pre-packaged device has been prepared, a tendon can be placed through it.

In the embodiment shown in FIG. 2, the suture 200 is configured to produce a nail knot when the joined with the tendon. The suture 200 includes a proximal portion 207, a central loop portion 208, and a distal portion 209. Due to the nail knot configuration, the distal portion 209 is continuous with a proximal portion 208p of the central portion 208, and the proximal portion 207 is continuous with a distal portion 208d of the central portion 208. Hence, when tension or a pulling force is applied to proximal portion 207 toward the proximal direction, and/or tension or a pulling force is applied to distal portion 209 toward the distal direction, a constriction or tightening is occasioned in the central loop portion 208. As shown here, the configuration of suture 200 may be referred to as a nail knot cinch 205, configured to receive a tendon which may be referred to as a nail knot post, such that the nail knot cinch (suture) and the nail knot post (tendon) can be coupled to form a nail knot.

Figure 3:
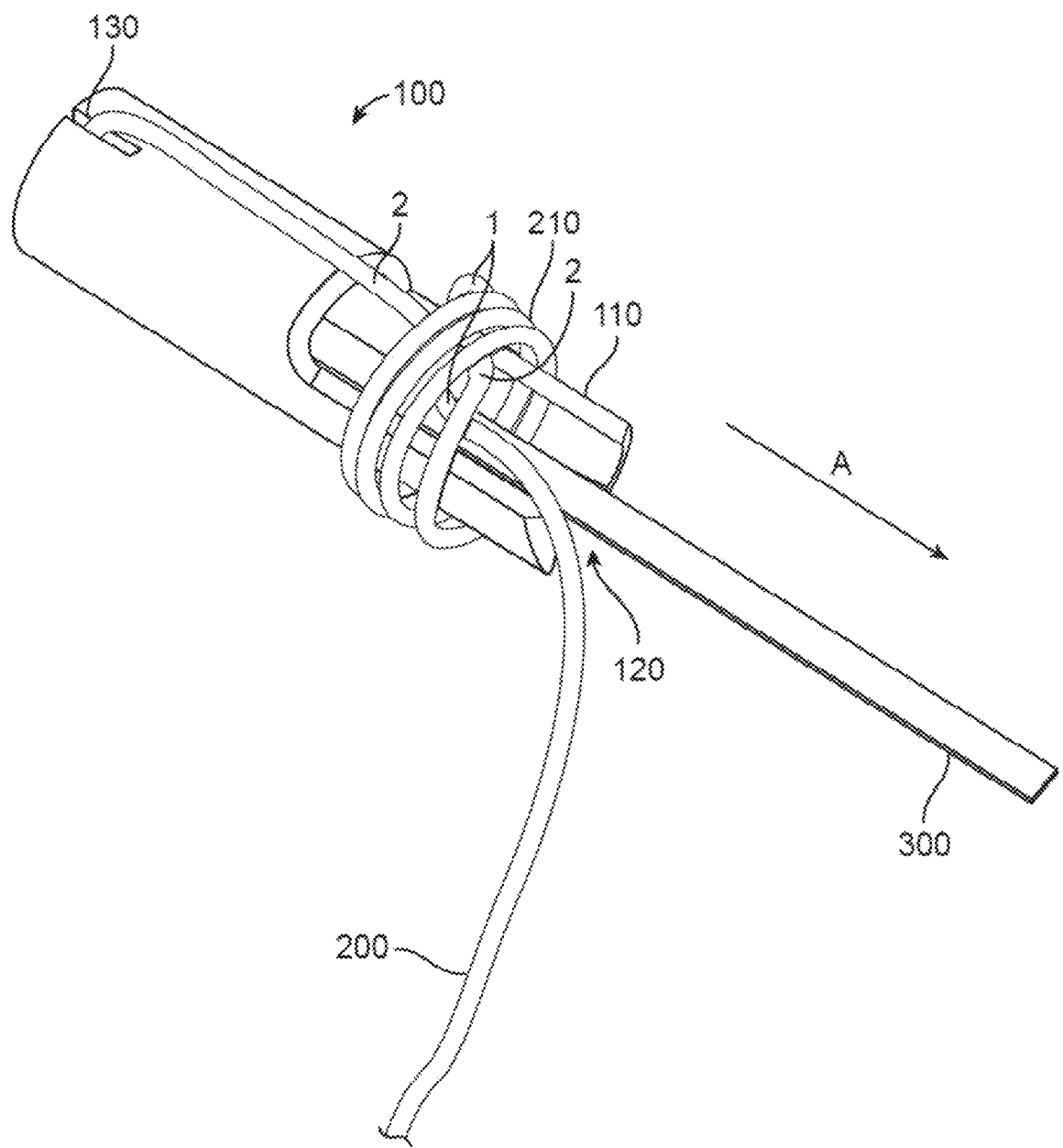
FIG. 3 illustrates aspects of a tendon inserted in a suture knot tool loaded with a suture, in accordance with some embodiments.

FIG. 3 illustrates a suture knot tool 100, a suture 200, and a tendon 300. The suture 200 is loaded on the suture knot tool 100, and the tendon 300 extends through the suture knot tool 100 and through a loop 210 with multiple windings formed by the suture 200. The various features, for example the cut-out 110, the notch 120, and/or the slot 130, can enable the suture to engage the tool in certain desired ways. For example, a V-shaped notch could serve as a cleat or tether into which the suture could be situated or pulled into, or otherwise secured or held by, and the suture could be removed therefrom when the surgeon is ready to place the tendon through the tube and looped suture. In some cases, the tendon repair techniques disclosed herein can be used in anterior cruciate ligament (ACL) repair, bicep tendon repair, Achilles tendon repair, hand tendon repair, or any other desired tendon repair, ligament repair, or other tissue repair in the patient as disclosed elsewhere herein. Due to the nail knot configuration, sections 1-1 are continuous and sections 2-2 are continuous. When tension or a pulling force is applied to a proximal portion of the suture toward the proximal direction, and/or tension or a pulling force is applied to a distal portion of the suture toward the distal direction, a constriction or tightening is occasioned in the central loop portion 210.

In use, the suture can be slid off from the tool (e.g. in a distal direction as indicated by arrow A) and then constricted about the tendon (e.g. by pulling a distal portion of the suture and a proximal portion of the suture away from each other, by pulling a distal portion of the suture in a distal direction, or by pulling a proximal portion of the suture in a proximal direction). Excess material (suture and/or tendon) can be trimmed as desired.

Figure 4:
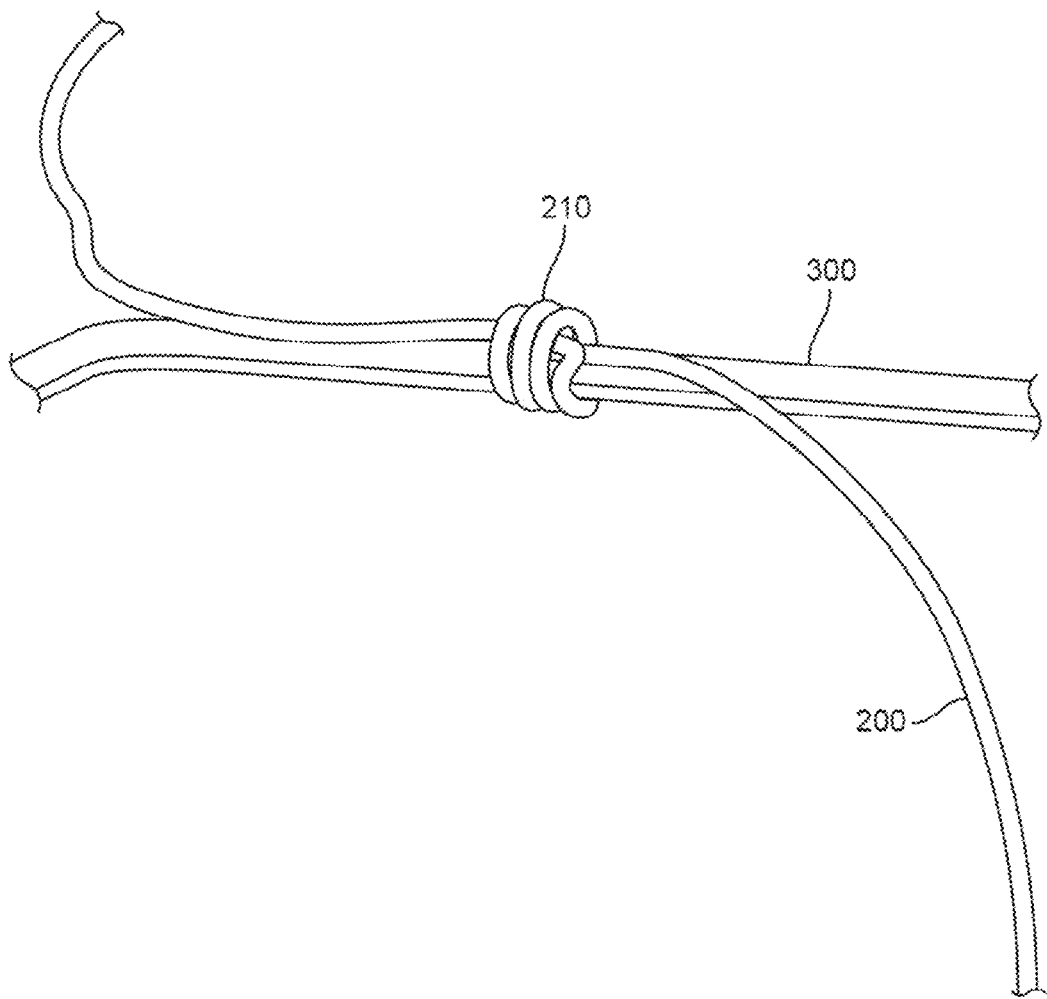
FIG. 4 illustrates aspects of a suture knotted about a tendon, in accordance with some embodiments.

In FIG. 4, the suture knot tool (not shown) has been removed, and the loop 210 of the suture 200 has been tightened or constricted around the tendon 300. Because the suture 200 wraps around or encircles the tendon 300, and does not pierce through the tendon 300, the tendon 300 is much less likely to fail or pull apart, which may otherwise be more likely to occur if the suture 200 were to pierce through the tendon 300.

Figure 5A:
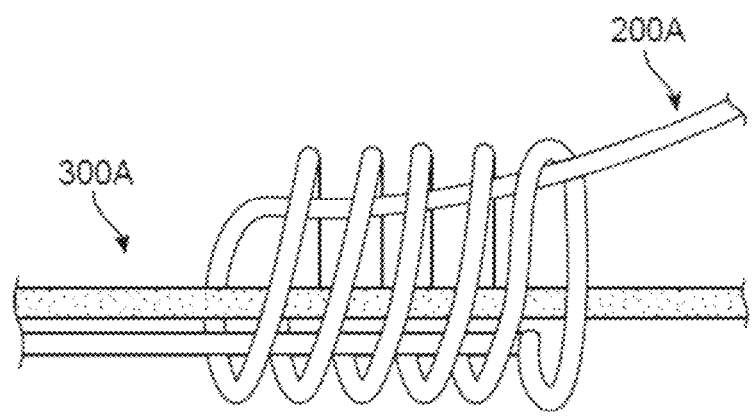
FIGS. 5A to 5E illustrate aspects of sutures knotted about tendons, in accordance with some embodiments.
Figure 5B:
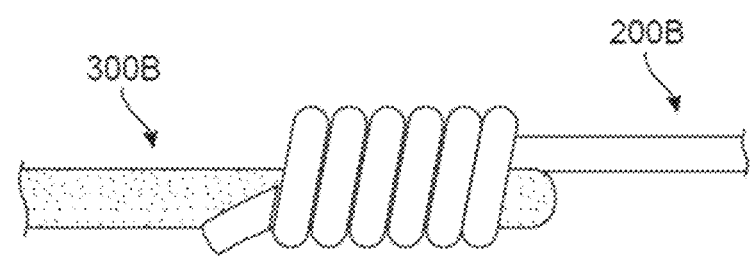
Figure 5C:
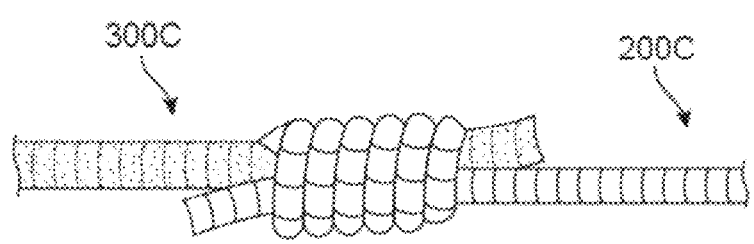
Figure 5D:
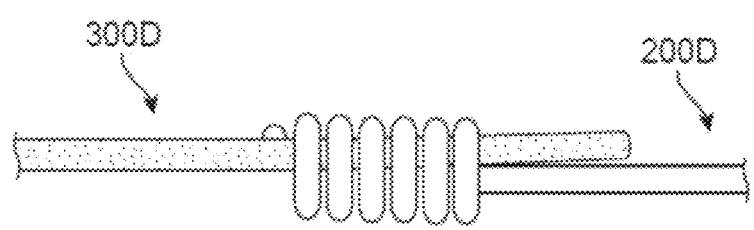
Figure 5E:
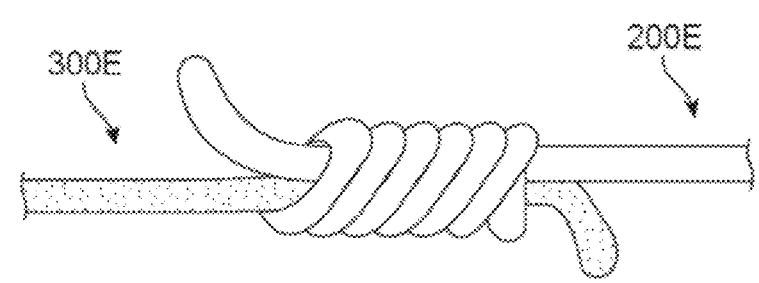
Figure 5F:
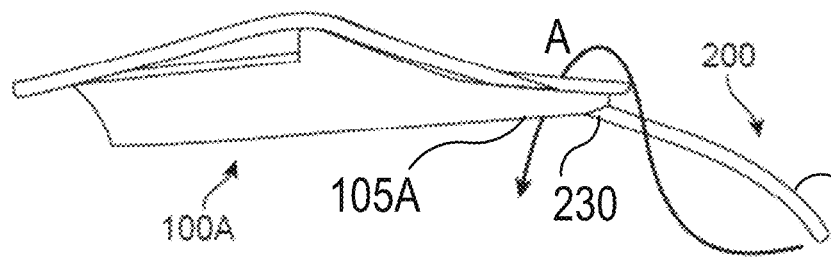
FIGS. 5F to 5J illustrate method aspects of a technique for knotting a suture about a tendon, in accordance with some embodiments.
Figure 5G:
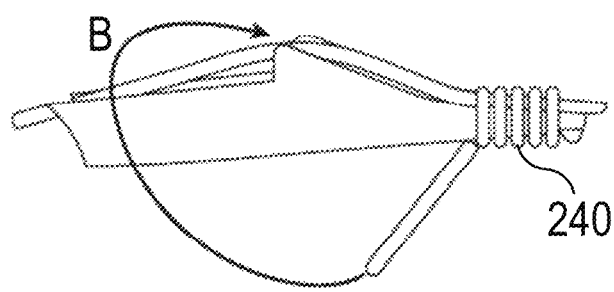
Figure 5H:
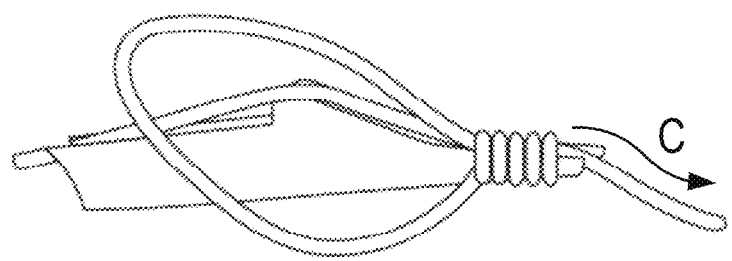
Figure 5I:
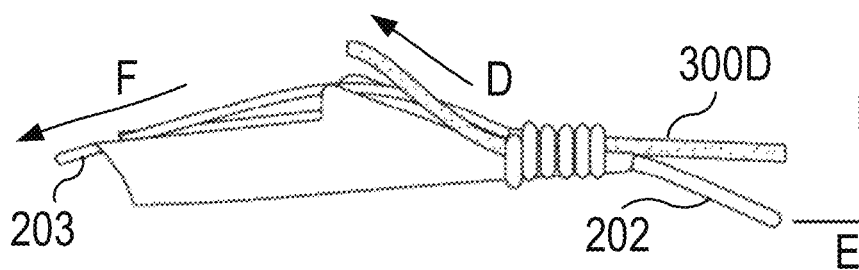
Figure 5J:
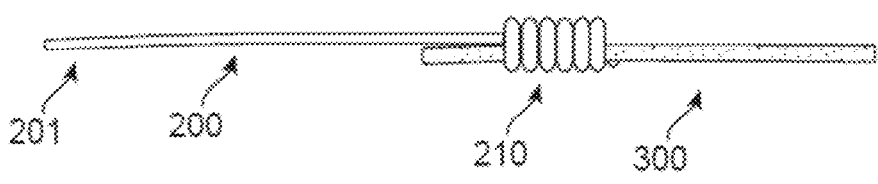

FIGS. 5A to 5E provide various schematic representations of a suture (200A-E) which has been knotted about a tendon (300A-E) using a suture knot tool or arthroscopic system as disclosed herein. In exemplary embodiments, the knot which is formed between the suture and the tendon can be referred to as a nail knot. As shown in FIG. 5B, for example, the tendon 300B can have a diameter that is significantly greater than the diameter of the suture 200B. The nail knot configurations disclosed herein are particularly well suited for use in attaching larger diameter tendons or other anatomical tissues with relatively smaller diameter sutures. FIGS. 5F to 5J illustrate an exemplary method of using a suture knot tool 100A to form a suture loop 210 about a tendon 300. As shown here, the distal tying end 202 of the suture 200 is looped about a central section 230 of the suture and the distal section 105A of the suture knot tool 100A, as indicated by arrow A. After the distal tying end 202 has been wrapped around in several turns, it can be advanced distally within the suture knot tool 100A and the coiled loops 210, as indicated by arrows B and C. The tendon 300D can be inserted or advanced proximally through the suture knot tool 100A and coiled loops, as indicated by arrow D. Once the tendon 300D is within the loops 210, the distal end 202 of the suture can be pulled or advanced distally as indicated by arrow E, and/or the proximal section 203 of the suture can be pulled or advanced proximally as indicated by arrow F, and the suture knot tool 100A can be withdrawn, so as to tighten the loops 210 about the tendon 300D.

In some cases, the free end 201 of the suture can be attached to the body of the patient in various ways, for example by inserting it into a tunnel bore in a bone and anchoring it thereto.

In some cases, the free end 201 could be secured by an interference screw, to hold the free end 201 with the bone. In some cases, a suture anchor could be used to secure the free end 201 with the bone.

Figure 6:
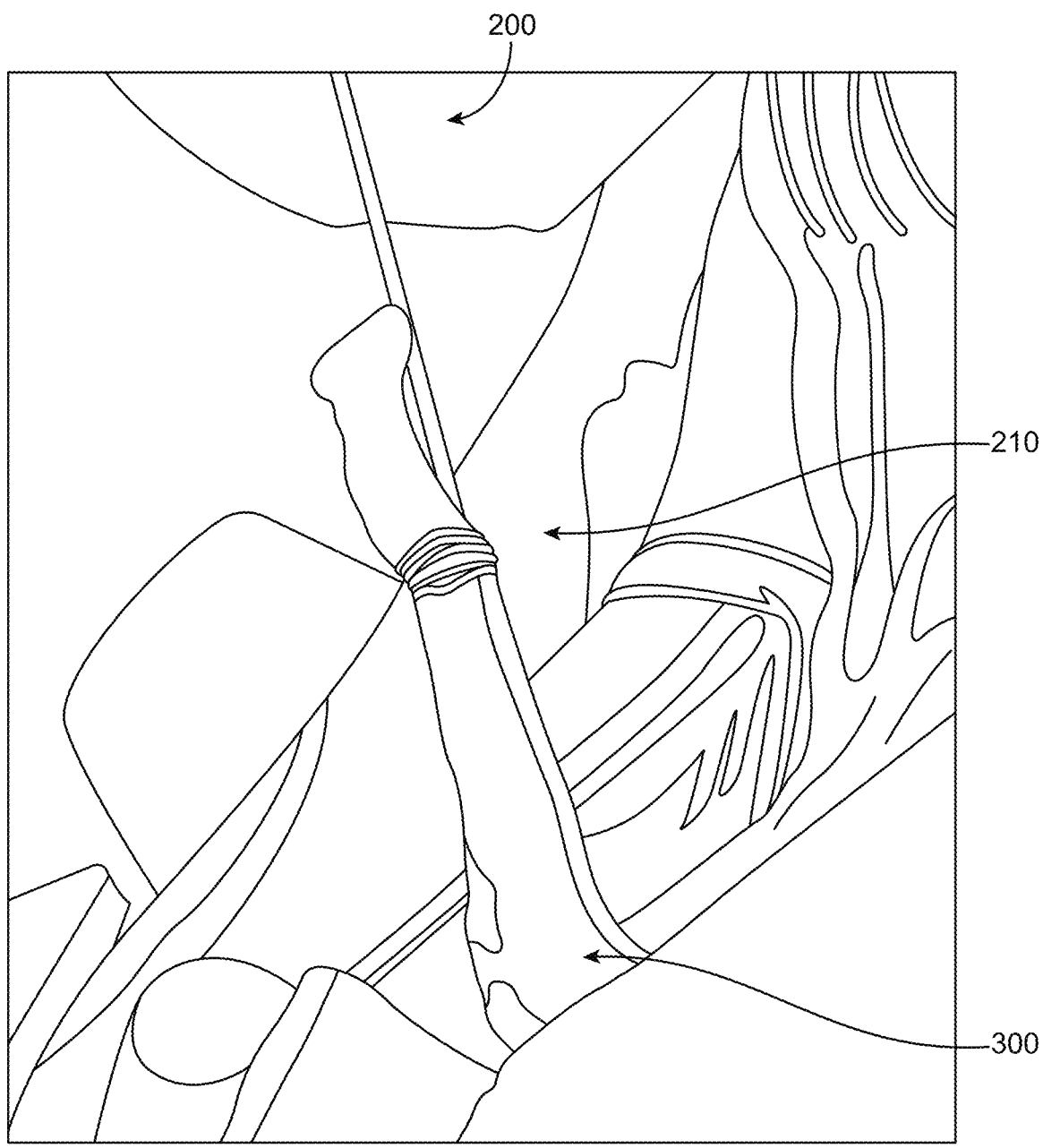
FIG. 6 illustrates aspects of a suture knotted about a tendon, in accordance with some embodiments.

In the surgical procedure shown in FIG. 6, the suture knot tool (not shown) has been removed, and the loop 210 of the suture 200 has been tightened or constricted around the tendon 300.

Figure 7:
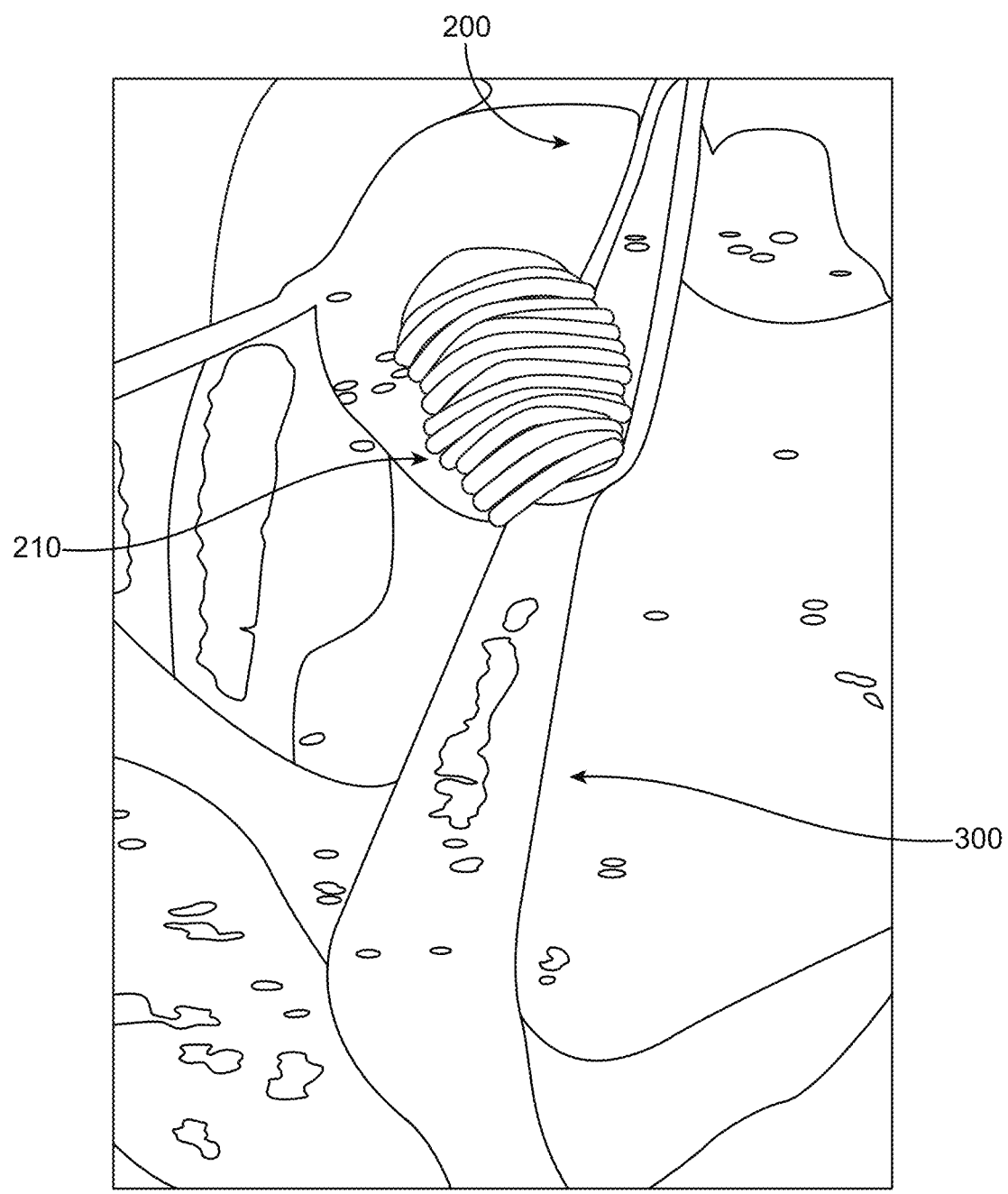
FIG. 7 illustrates aspects of a suture knotted about a tendon, in accordance with some embodiments.

In the surgical procedure shown in FIG. 7, the suture knot tool (not shown) has been removed, and the loop 210 of the suture 200 has been tightened or constricted around the tendon 300. In this embodiment, both ends of the suture were retained, because the tendon was small, and the tissue was weak and atrophied. Embodiments of the present invention are well suited for use in attaching with weak or damaged tendons, or in some cases diseased tendons, because they do not require the tendon to be pierced, but rather involve the application of a compression or circumferential constricting force applied about the tendon.

Figures 8A, 8B:
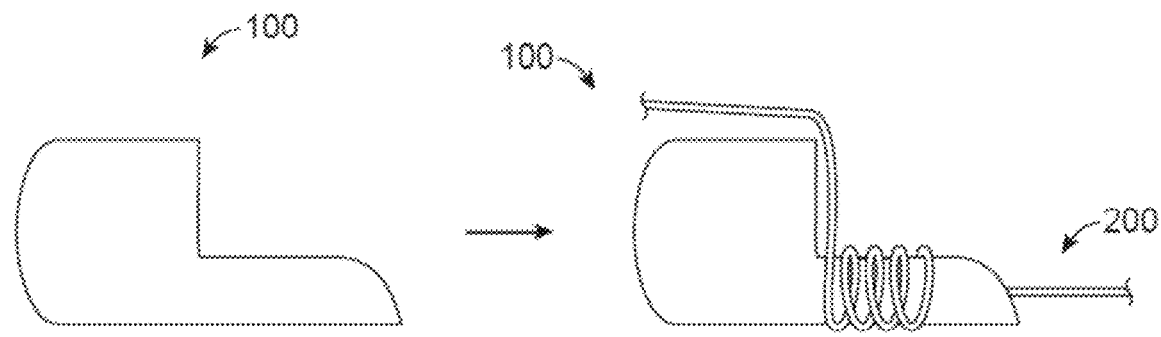
FIGS. 8A and 8B illustrate aspects of suture knot tool loaded with a suture, in accordance with some embodiments.
Figures 9A, 9B:
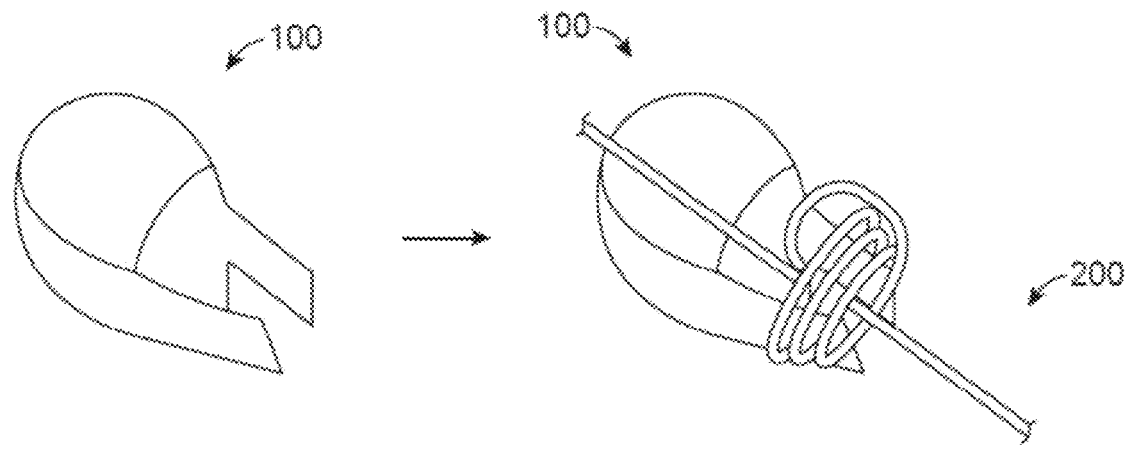
FIGS. 9A and 9B illustrate aspects of suture knot tool loaded with a suture, in accordance with some embodiments.

The side views provided by FIGS. 8A and 8B illustrate how a suture 200 can be loaded on a suture knot tool 100. The top perspective views provided by FIGS. 9A and 9B illustrate how a suture 200 can be loaded on a suture knot tool 100. Once a pre-loaded device has been prepared, a tendon can be placed through it.

Figure 10A:
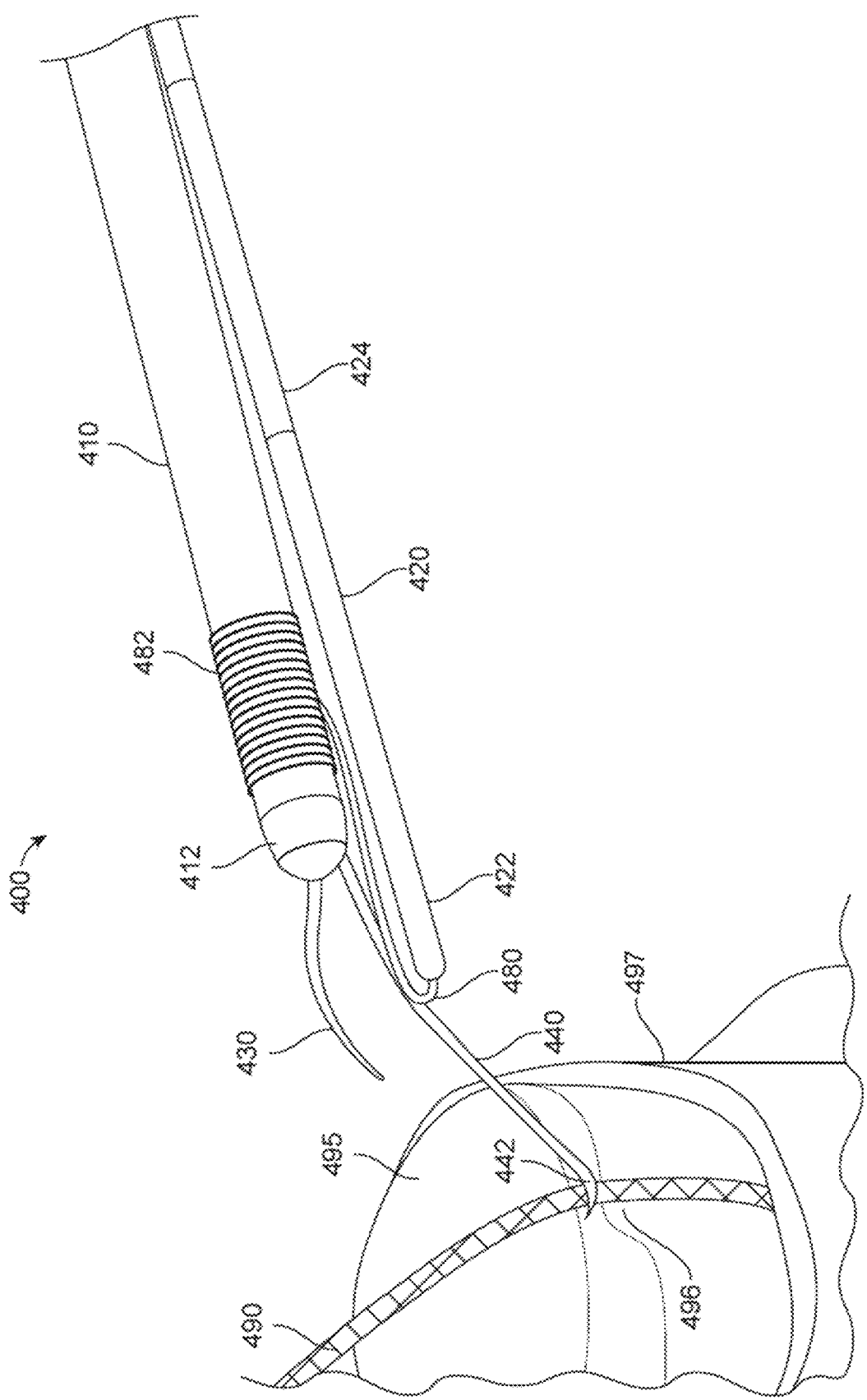
FIGS. 10A to 10H depict aspects of an arthroscopic method for deploying a suture using an arthroscopic system, in accordance with some embodiments.

FIGS. 10A to 10T depict aspects of a method of using an arthroscopic system 400 during a surgical procedure to deploy a suture 200, so that a loop or coil 210 of the suture 200 is tightened or constricted around a tendon 300. Hence, the suture knot techniques disclosed herein are well suited for use in arthroscopic procedures. In some cases, an arthroscopic system 400 can include a clipper for severing the tendon, a cannula, an attachment string for holding the tendon, and other assembly components. In some cases, an arthroscopic system 400 can include a sliding tube that can be operated to push a pre-loaded coil of suture on the tendon 300. In some cases, an arthroscopic system 400 can include or be used on conjunction with any of the suture knot tool embodiments (e.g. suture knot tool pre-loaded with a suture) disclosed herein.

As shown in FIG. 10A, arthroscopic system 400 includes an upper tube 410 having a distal portion 412, and a lower tube 420 having a distal portion 422 and a position marker 424 located proximal to the distal portion 422. System 400 also includes a cutting mechanism 430, and a pull thread 440, both of which may be at least partially disposed within the upper tube 410.

FIG. 10A also depicts a tendon 490, a bone 495 with a groove 496, and skin 497 of a patient (e.g. at a knee joint), and a suture 480 engaged with the system 400. The cutting mechanism 430, which may be a clipper, can slide longitudinally within the upper tube 410 (e.g. extending therefrom or retracting therein). Suture 480 includes a coil portion 482, wrapped about the upper tube 410, and configured to produce a nail knot when coupled with the tendon, as further discussed elsewhere herein. For example, the configuration of the suture 480 shown here can be referred to as a nail knot cinch. A distal portion 442 of the pull thread 440 is attached with the tendon.

Figure 10B:
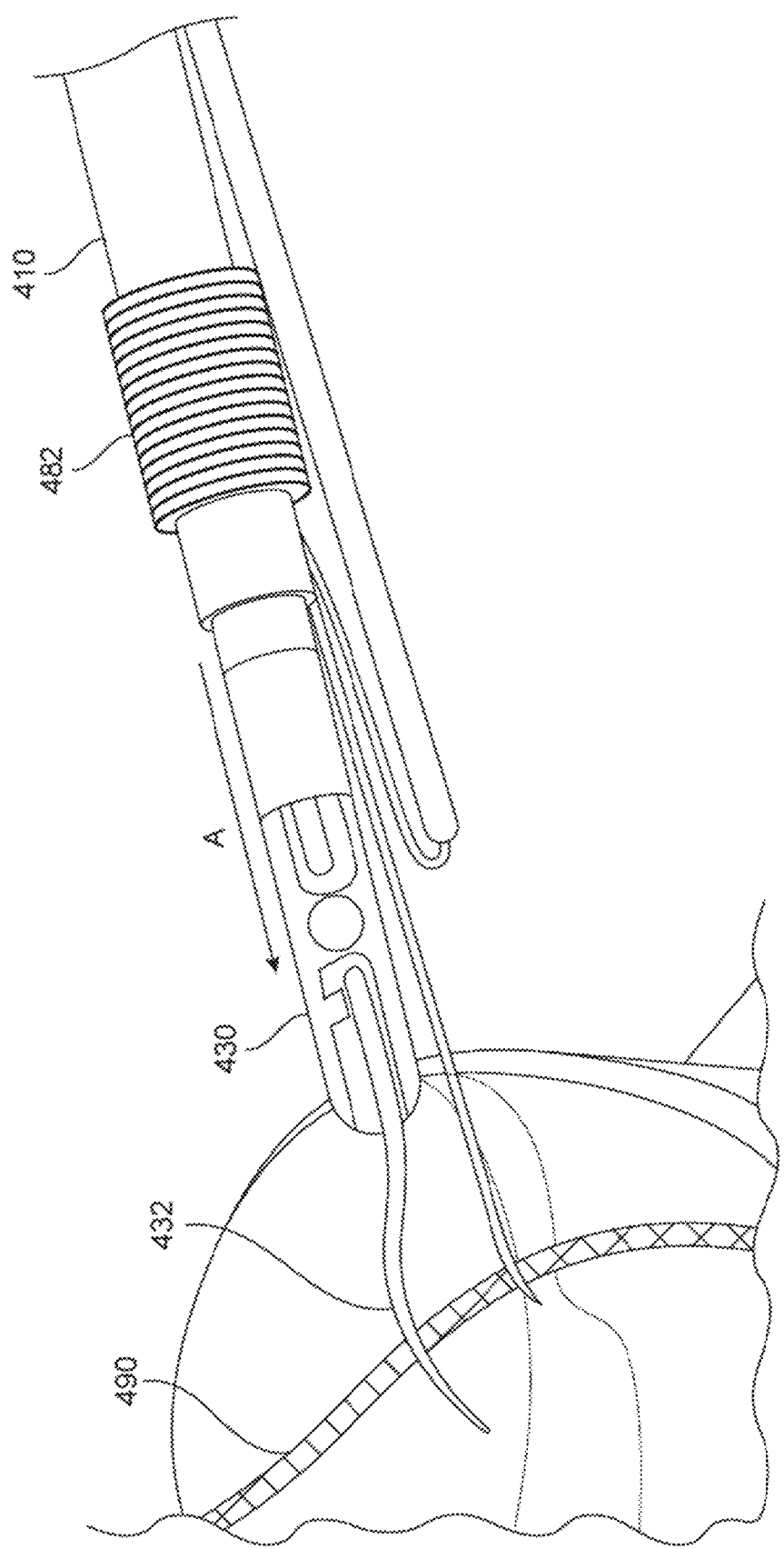

As shown in FIG. 10B, cutting mechanism 430 can be advanced distally (e.g. by extending the cutting mechanism distally relative to upper tube 410) in the direction indicated by arrow A, so that a cutting edge 432 of the cutting mechanism approaches the tendon 490.

Figure 10C:
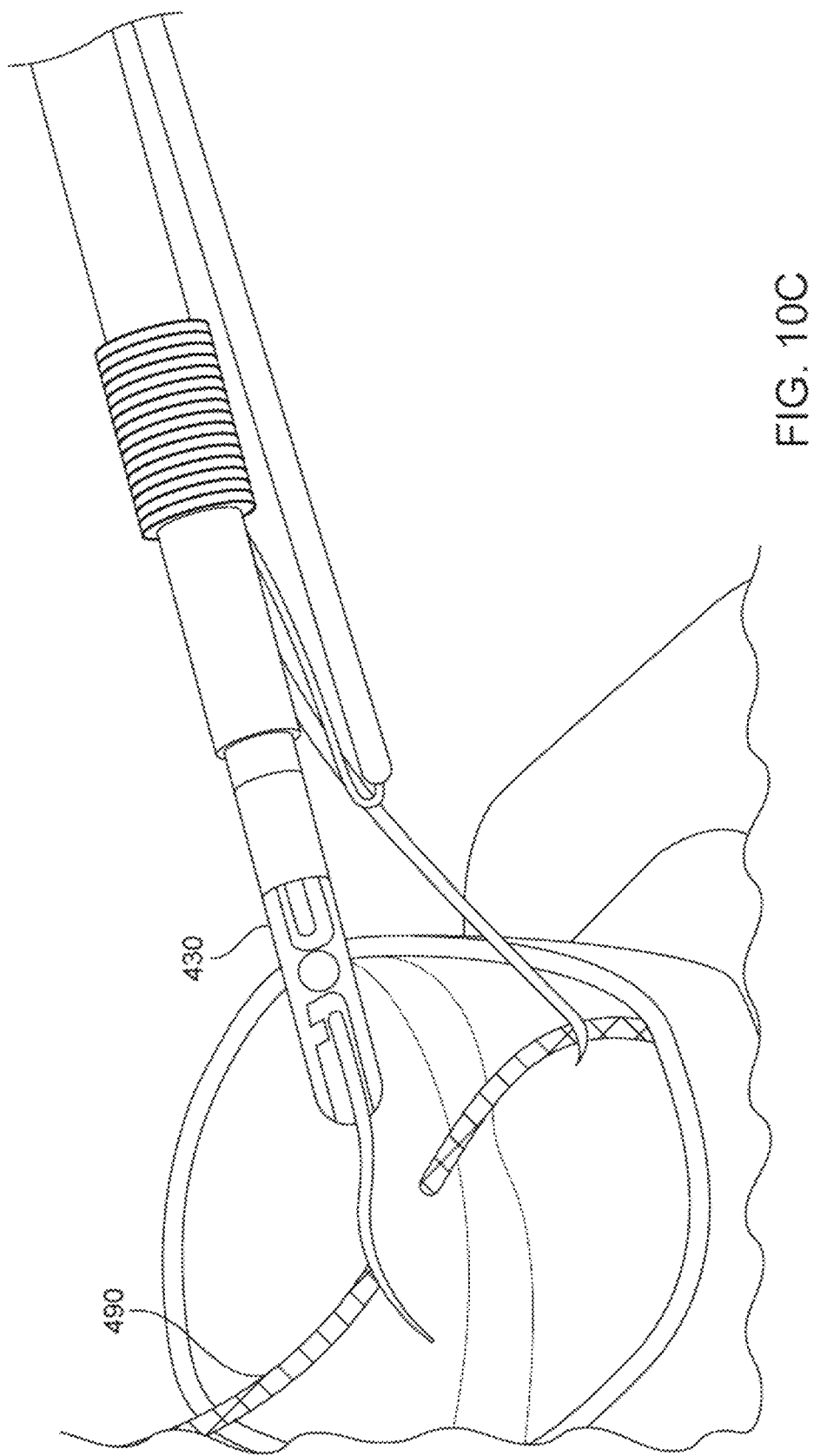
Figure 10D:
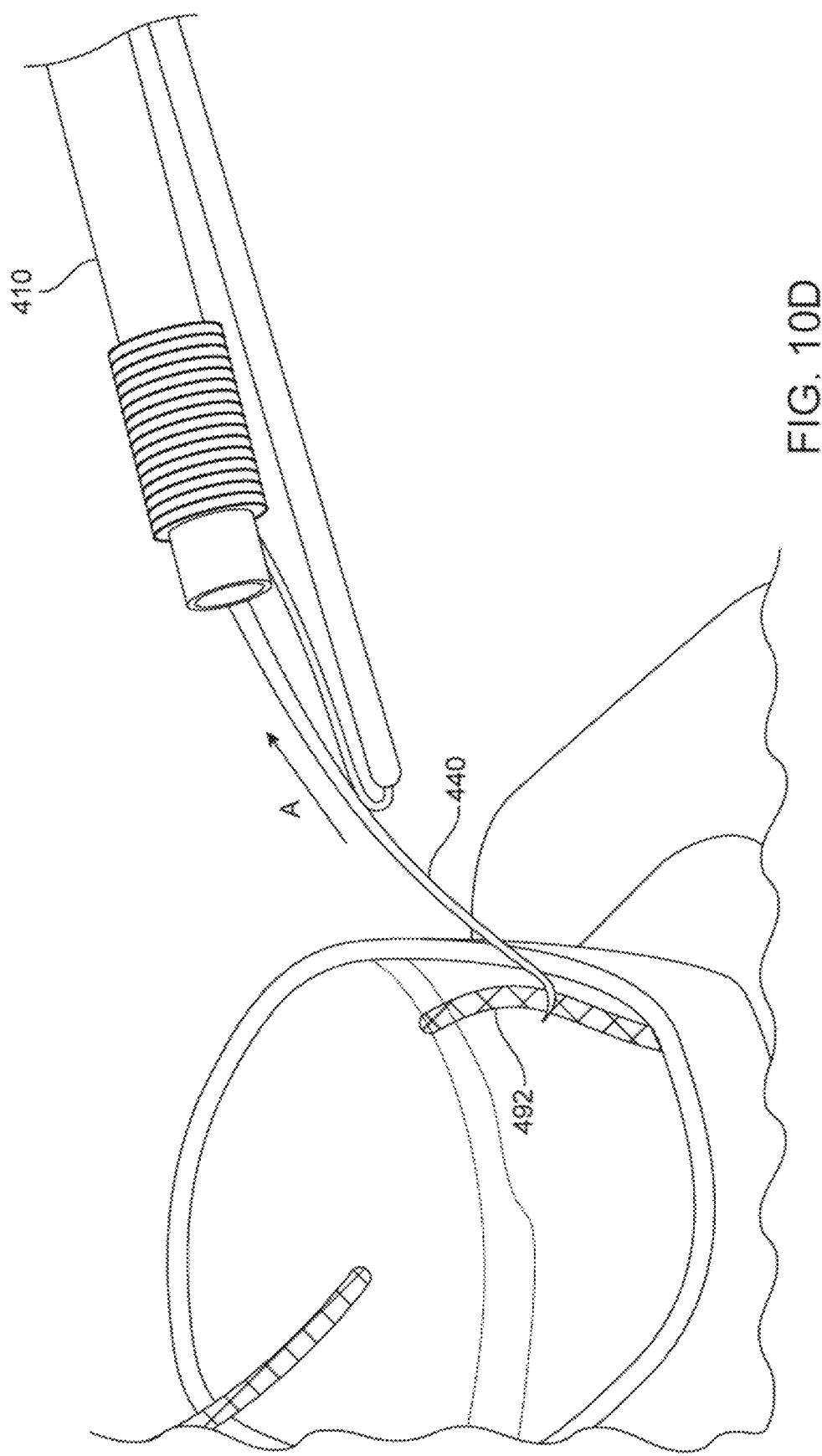
Figure 10E:
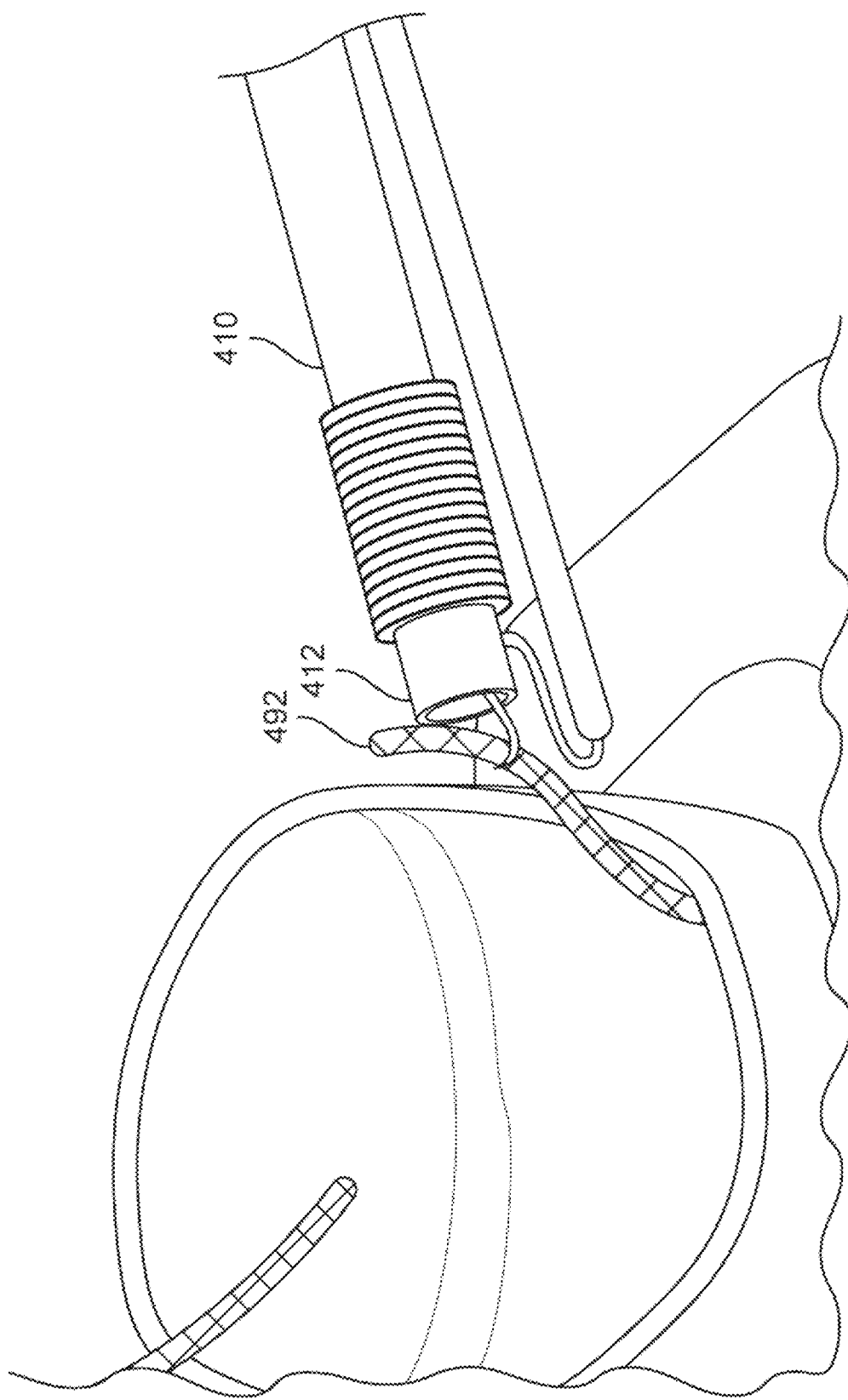
Figure 10F:
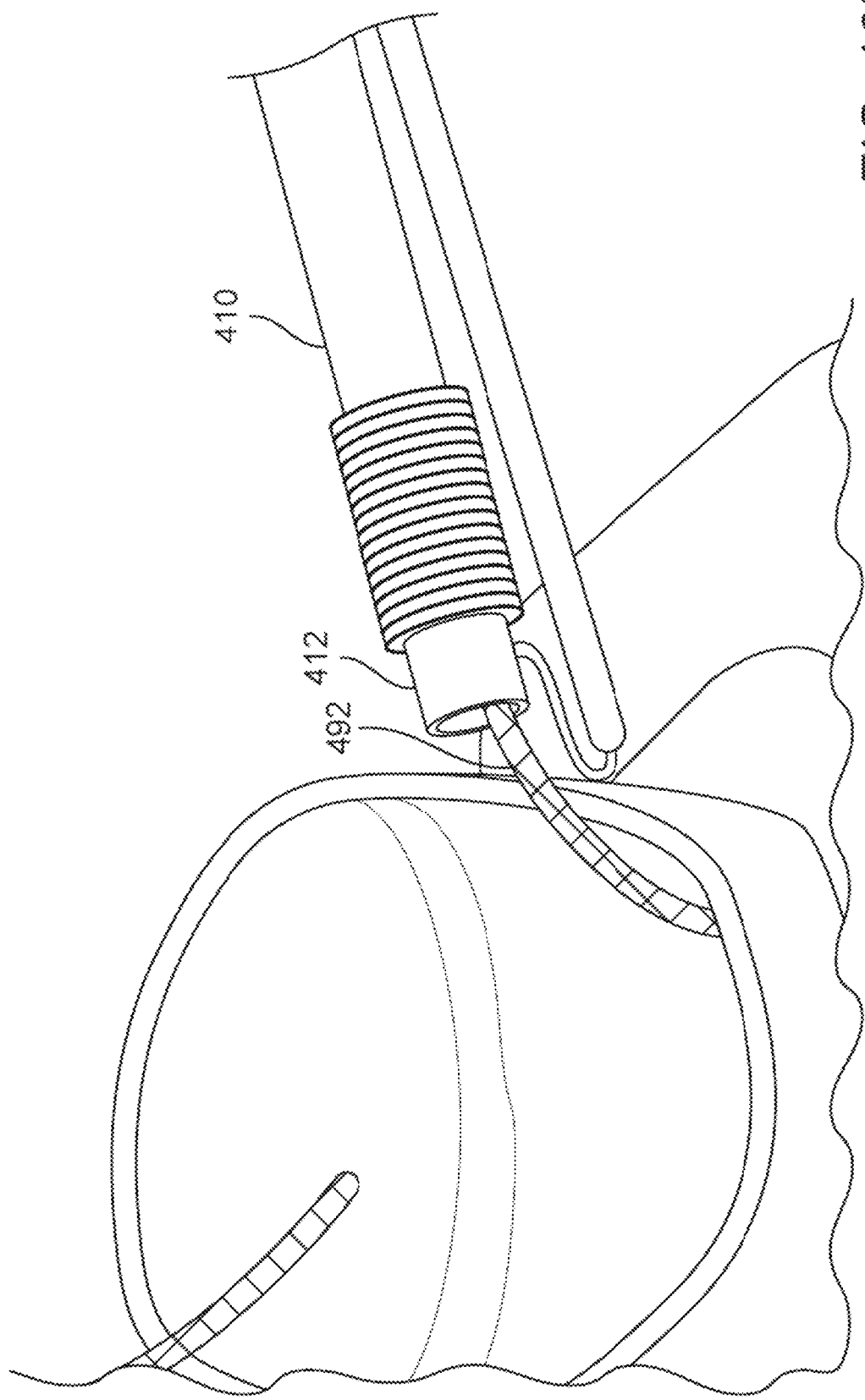

As shown in FIG. 10C, cutting mechanism 430 has now cut the tendon 490. As shown in FIG. 10D, the cutting mechanism has now been retracted proximally back into the upper tube 410 so that it cannot be seen. The pull thread 440 can be drawn proximally, as indicated by arrow A, which effectively begins to draw the tendon free end 492 toward the upper tube 410. As shown in FIG. 10E, the pull thread has now been pulled almost completely back into the upper tube 410, drawing the free end 492 of the tendon to the distal portion 412 of the upper tube 410. As shown in FIG. 10F, the free end of the tendon has now been drawn into the distal portion 412 of the upper tube 410. The pull thread is no longer visible.

Figure 10G:
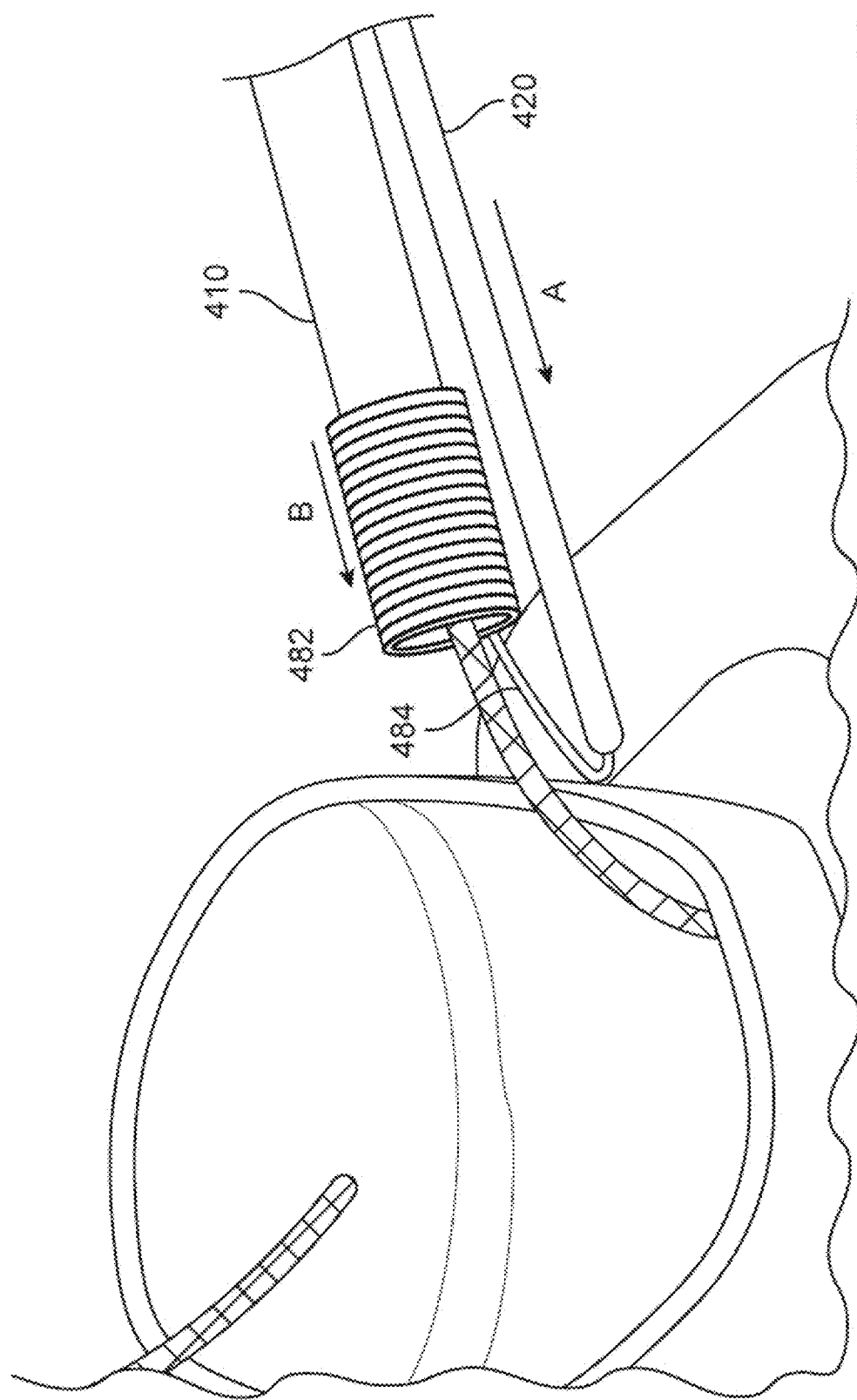

As shown in FIG. 10G, the lower tube 420 can be advanced distally (e.g. relative to upper tube 410) as indicated by arrow A, and the lower tube 420 is engaged with a proximal distal 484 of the suture 480 such that distal movement of the lower tube 420 causes a corresponding distal movement of the distal portion 484, thus sliding the coil portion 482 distally (e.g. relative to upper tube 410), as indicated by arrow B. As shown here, the distal edge of the coil portion 482 is beginning to slide off from the distal edge of the upper tube 410.

Figure 10H:
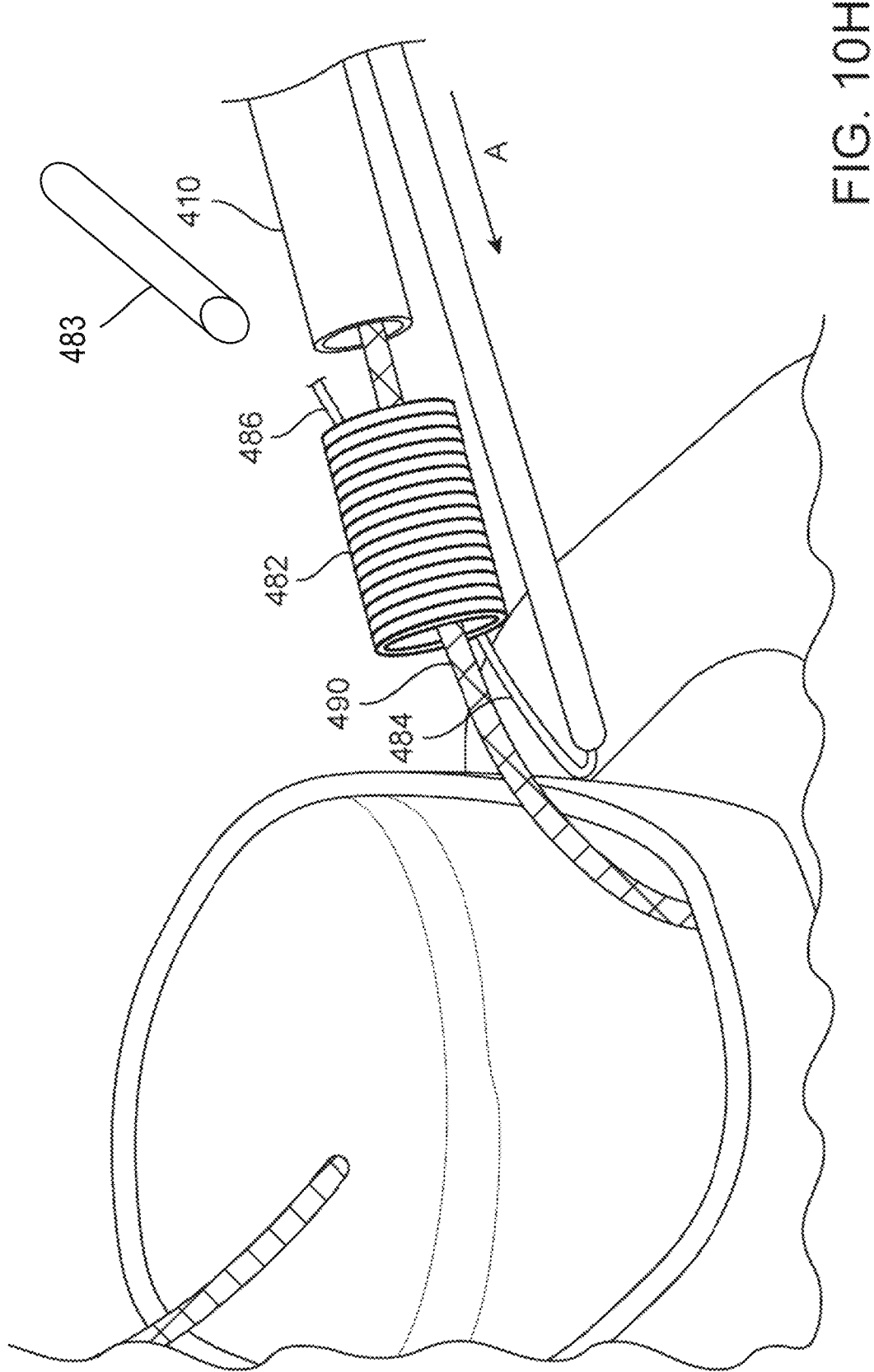

As shown in FIG. 10H, the lower tube 420 can continue to be advanced distally as indicated by arrow A, thus moving the coil portion 482 completely onto the tendon 490. As discussed elsewhere herein, it is then possible to apply tension or a pulling force to a proximal portion 486 of the suture toward the proximal direction, and/or apply tension or a pulling force to a distal portion 484 of the suture toward the distal direction, such that a constriction or tightening is occasioned in the central loop portion 482, thus compressing the central loop 482 about the tendon 490, thereby forming a nail knot. In some cases, proximal portion 486 is attached to or otherwise engaged with a tube 483 or other instrument that can be used to manipulate the proximal portion 486. For example, the proximal portion 486 can pass within the tube 483 and pulled or drawn taut by the surgeon.

Figure 11A:
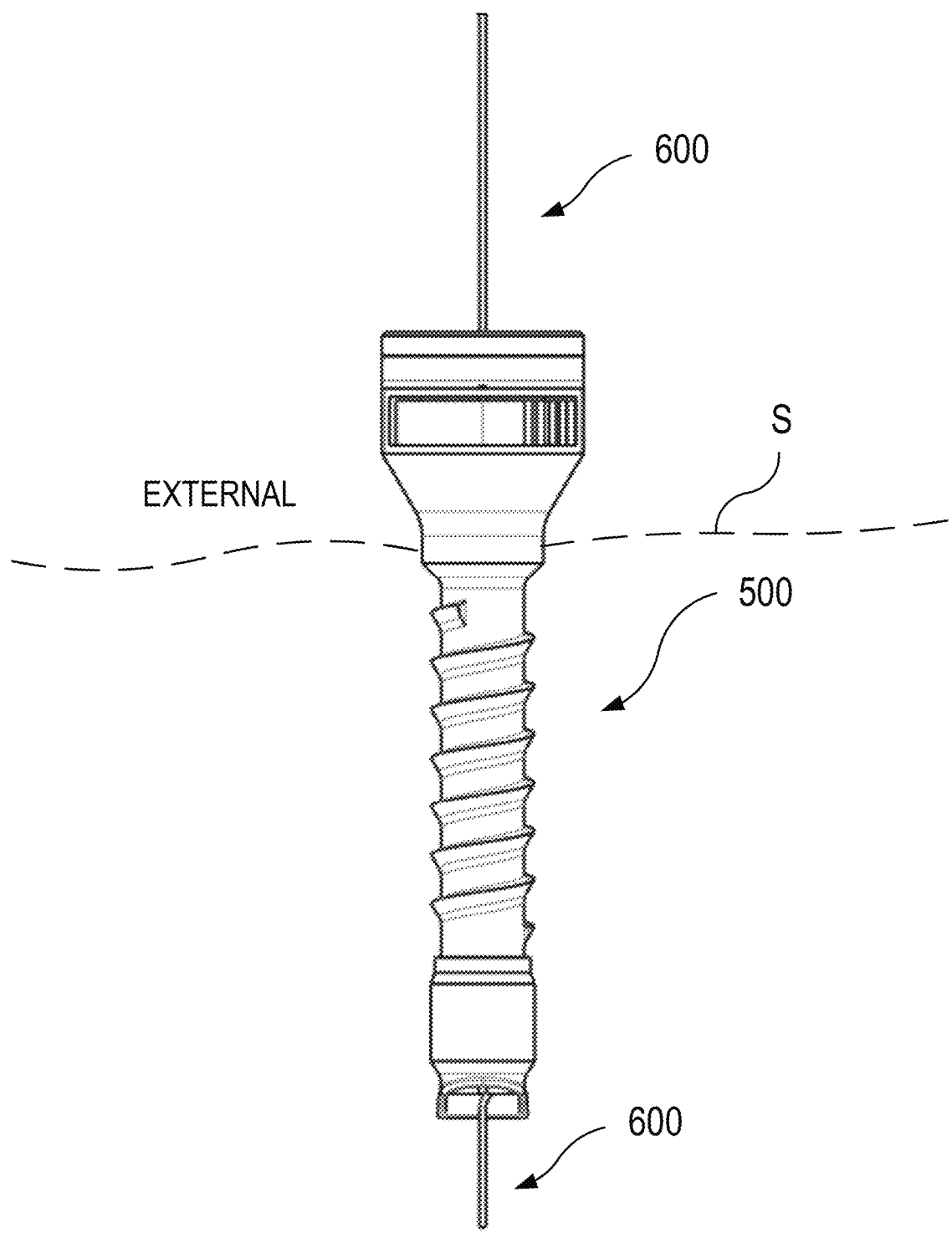
FIGS. 11A to 11T depict aspects of an arthroscopic method for deploying a suture using an arthroscopic system, in accordance with some embodiments.
Figure 11B:
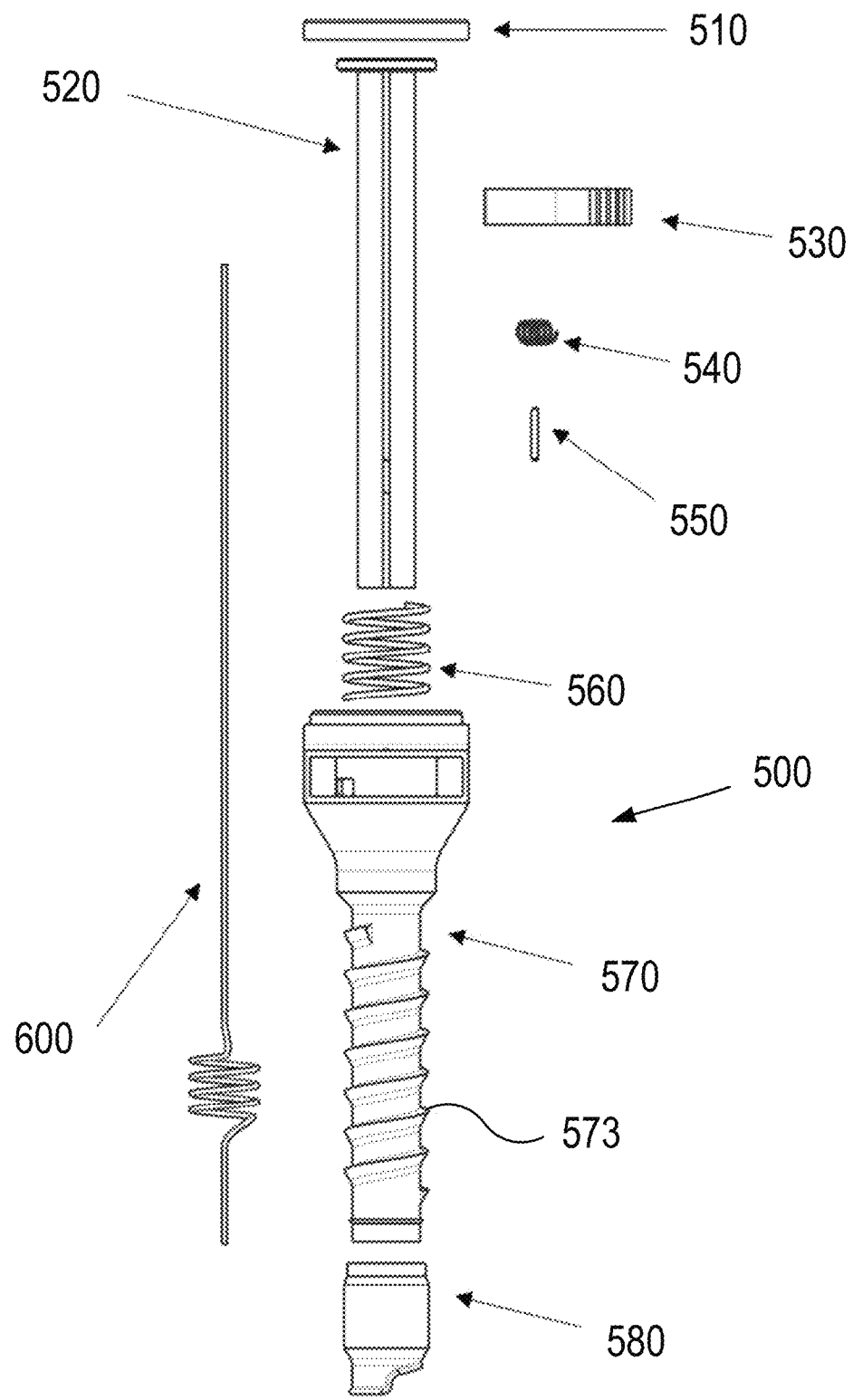
Figure 11C:
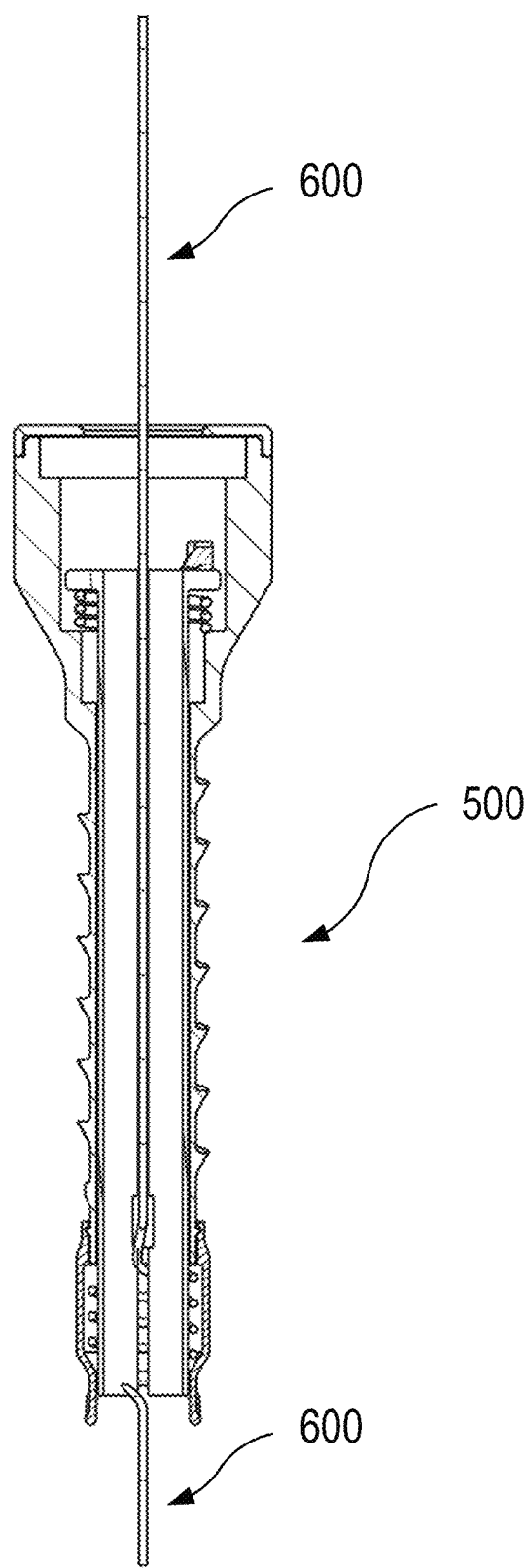
Figure 11D:
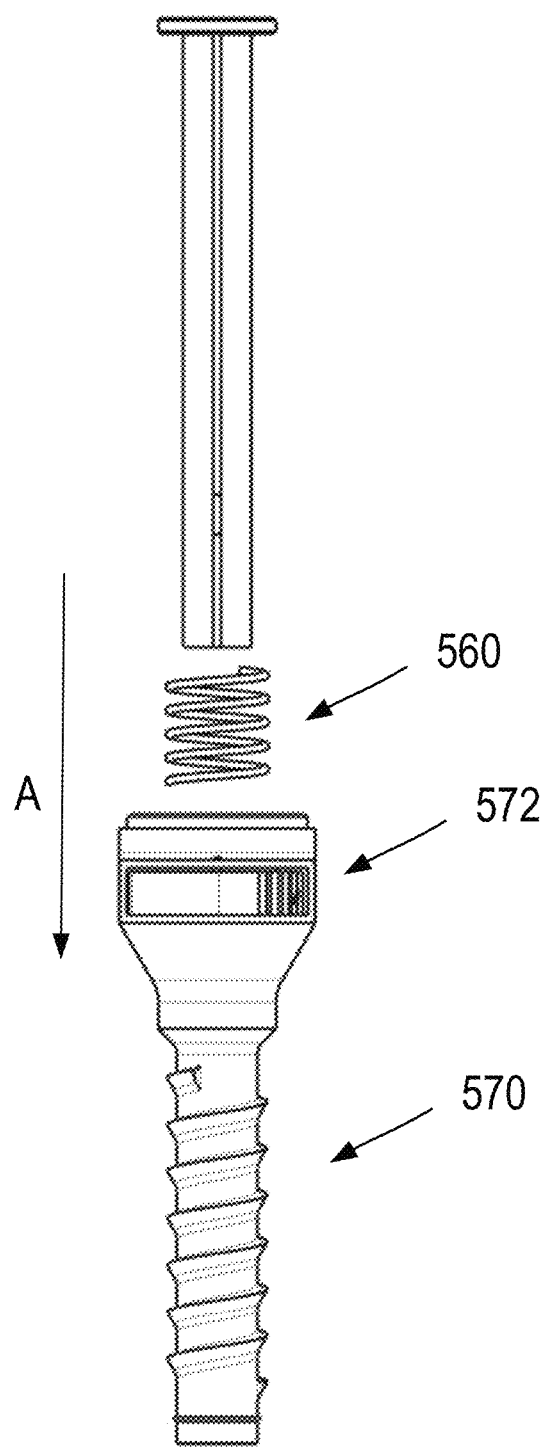
Figure 11E:
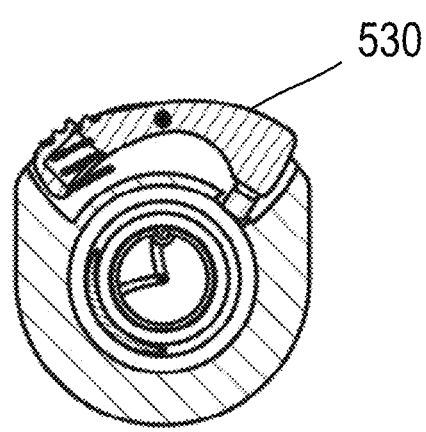
Figure 11G:
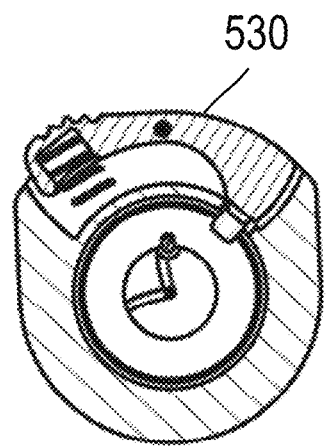
Figure 11F:
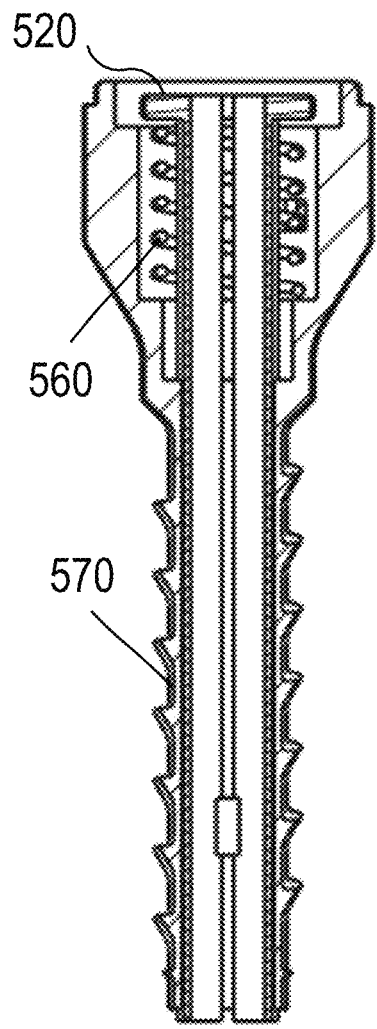
Figure 11H:
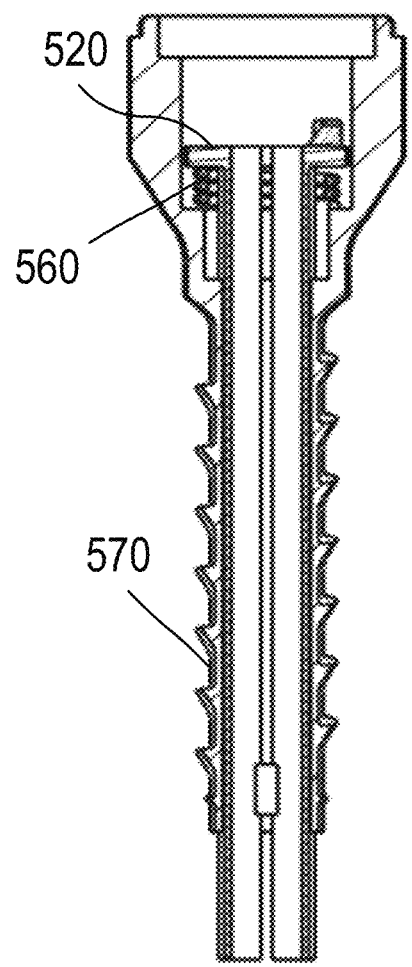
Figure 11I:
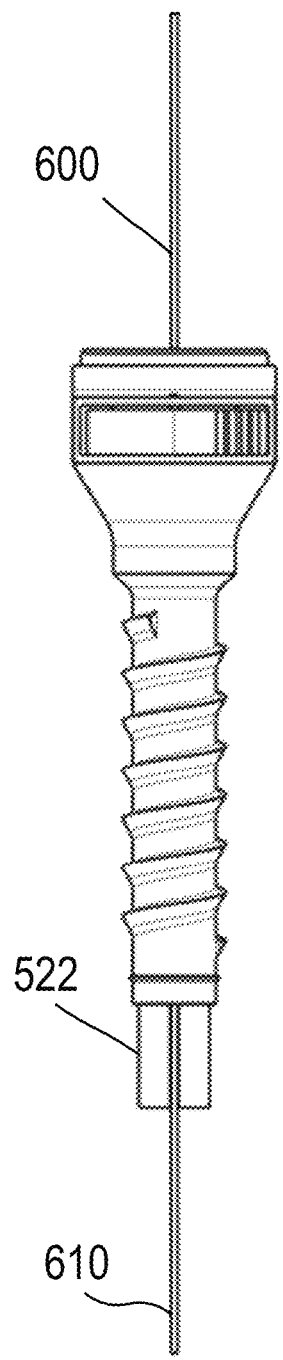
Figure 11J:
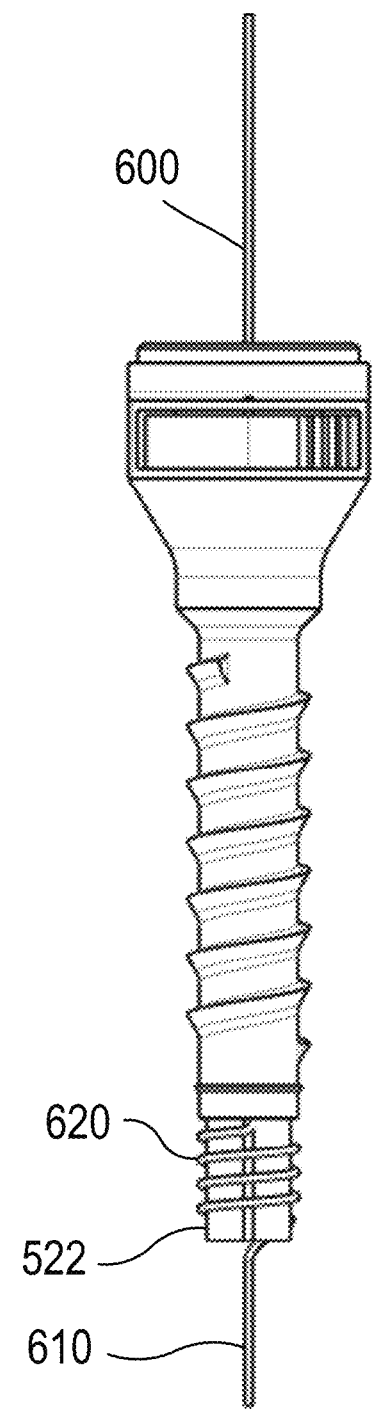
Figure 11K:
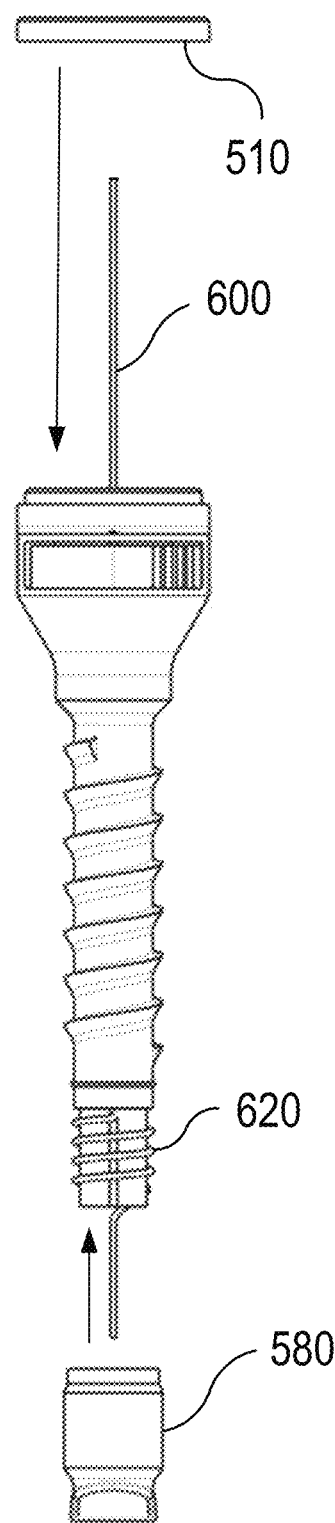
Figure 11L:
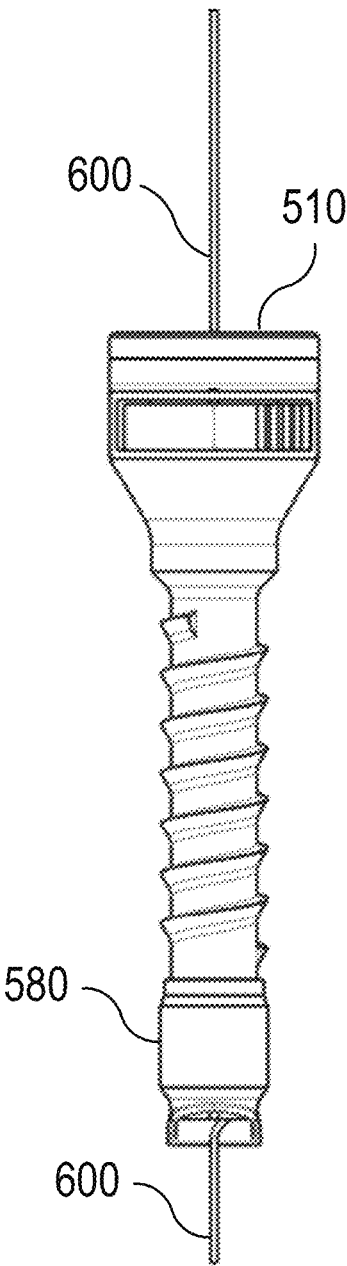
Figure 11M:
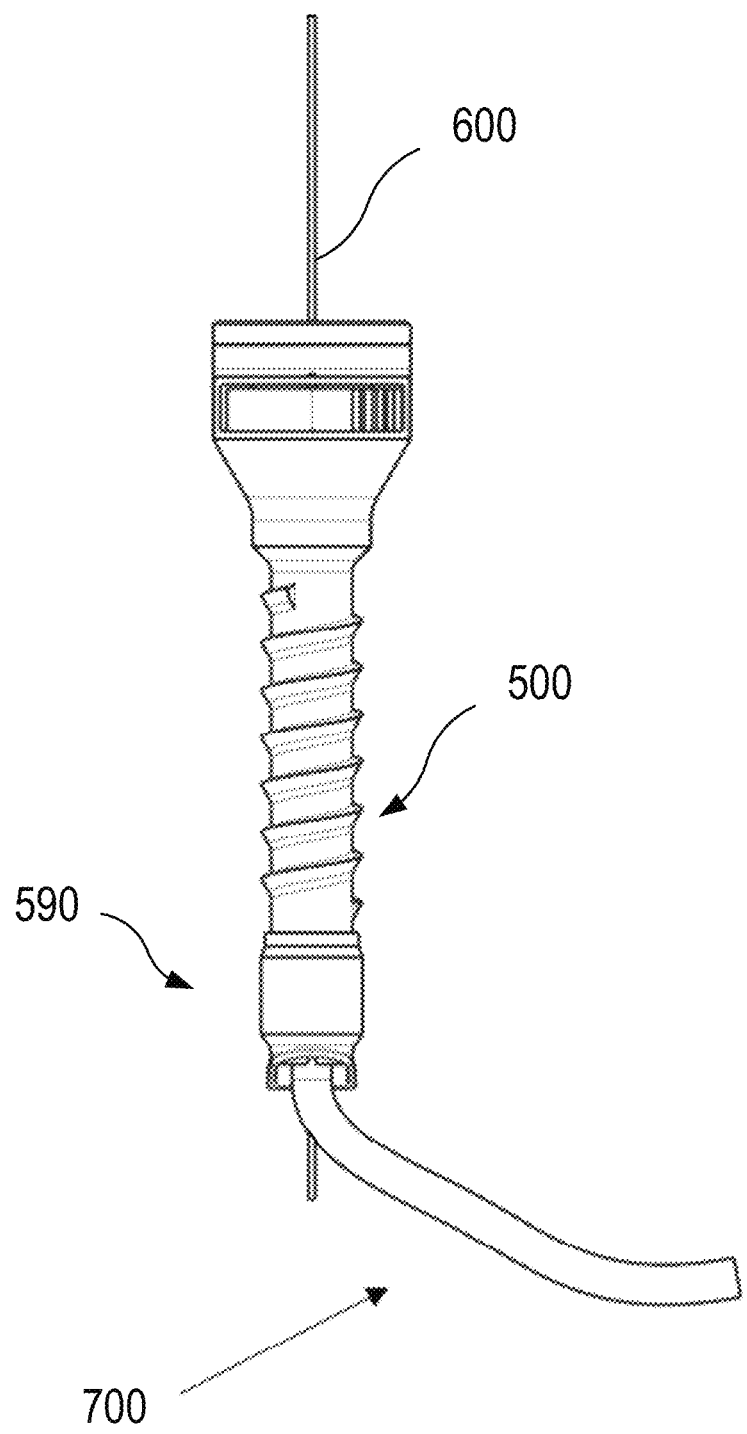
Figure 11N:
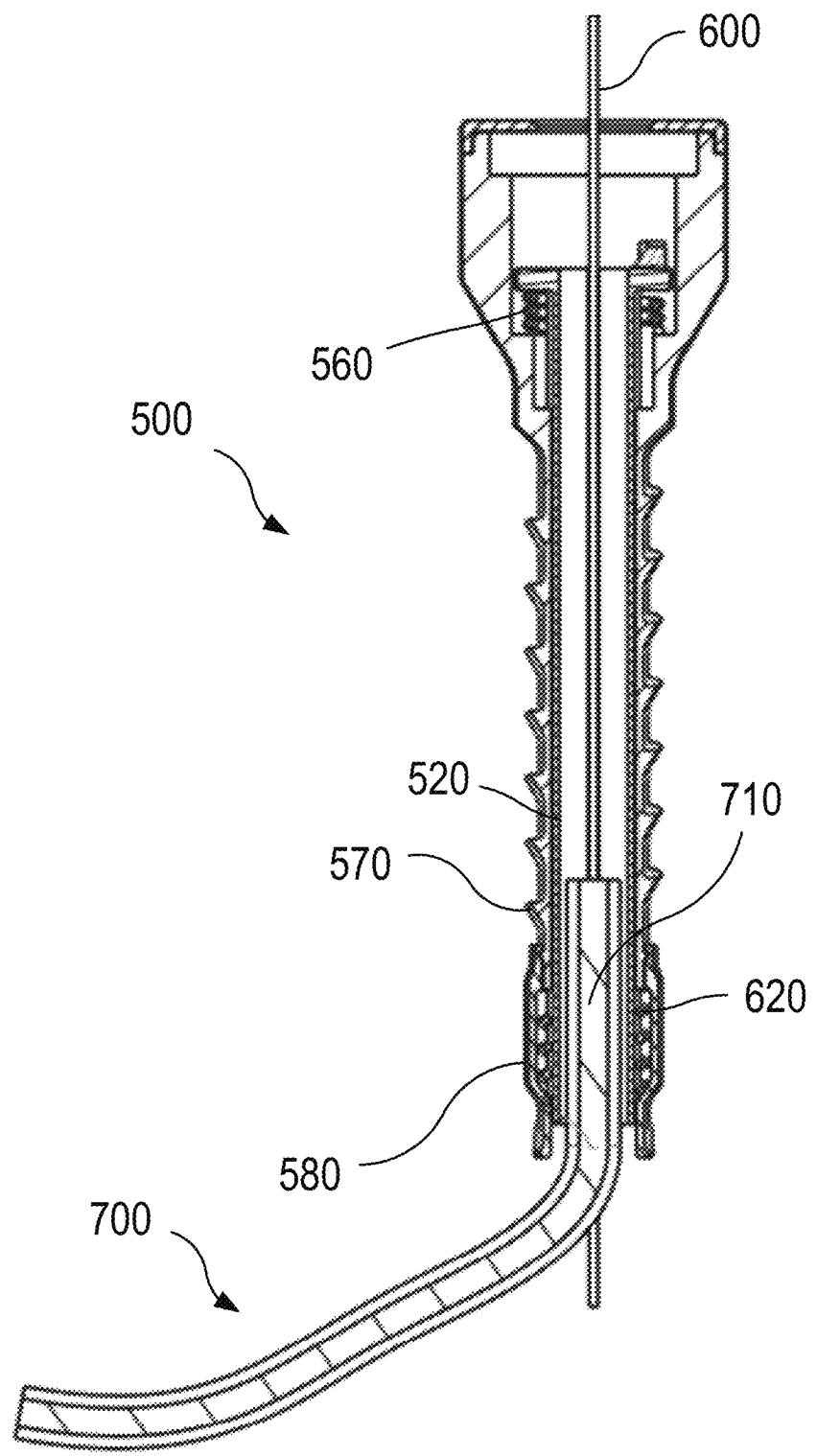
Figure 11P:
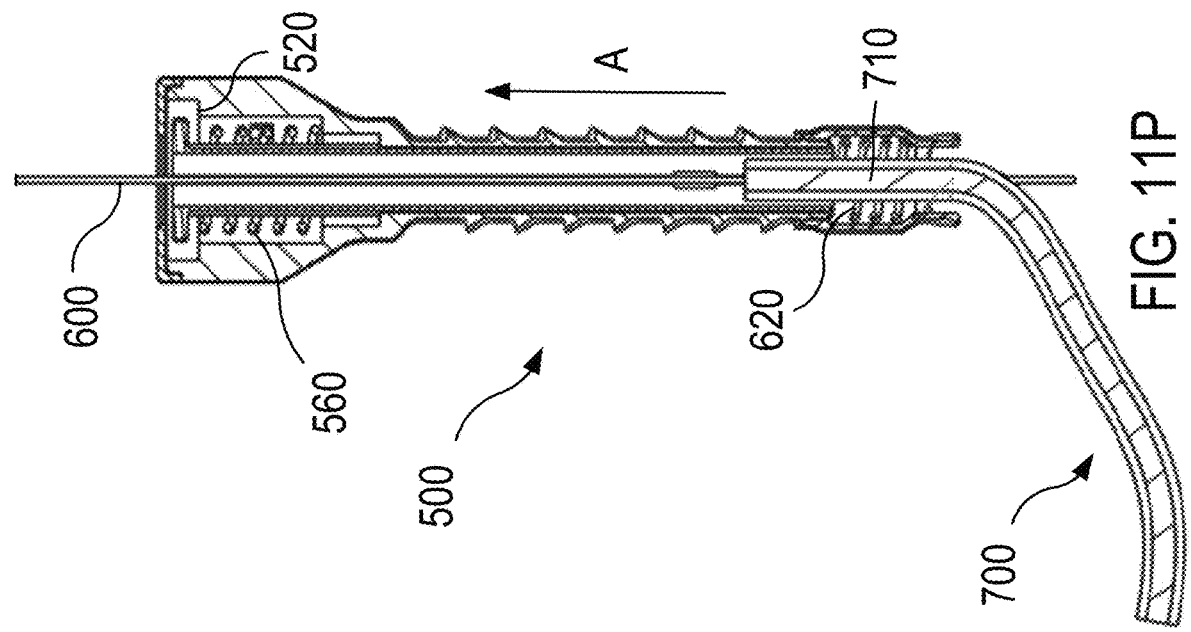
Figure 11O:
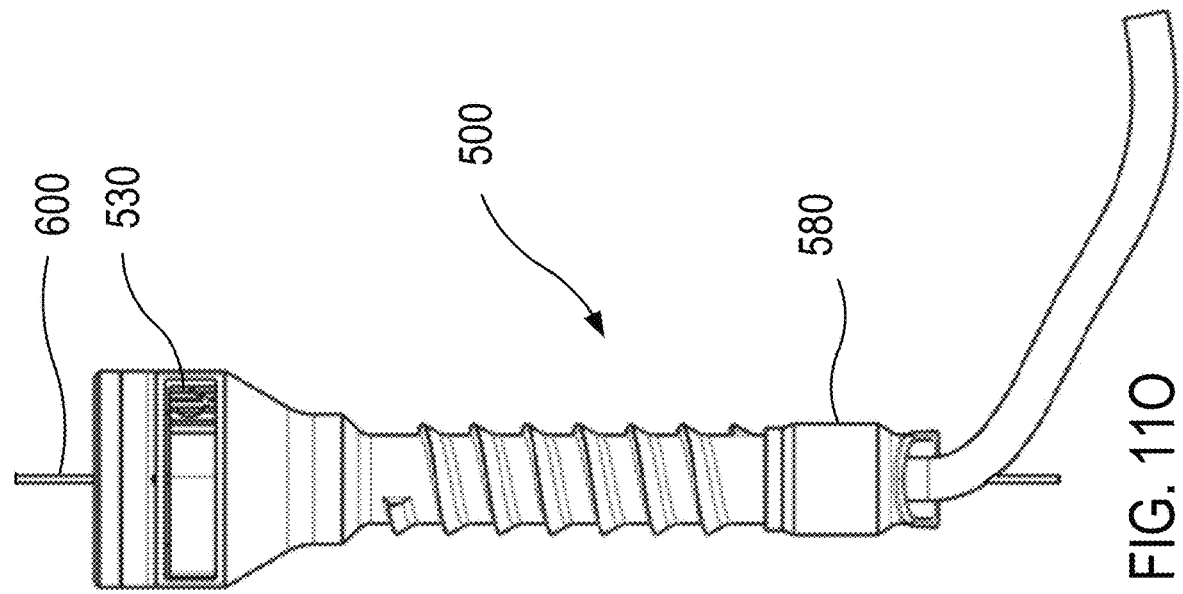
Figure 11T:
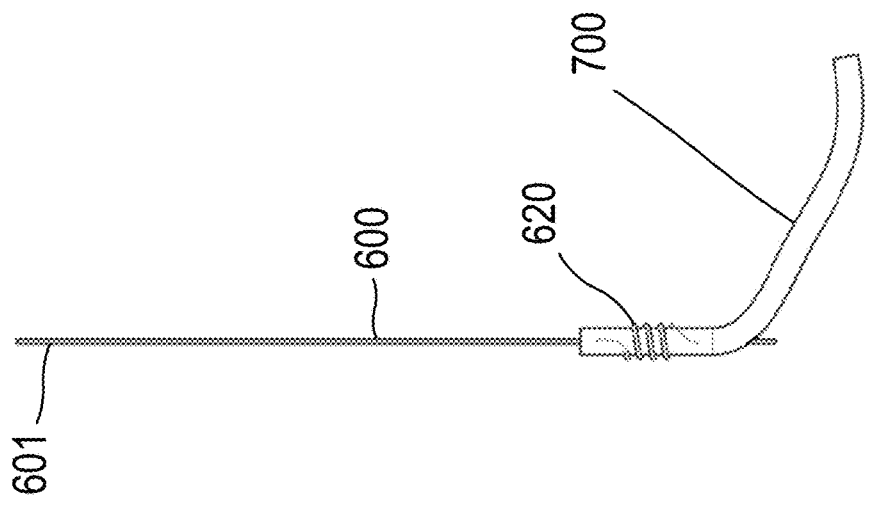

FIGS. 11A to 11T depict aspects of a method of using an arthroscopic system 500 during a surgical procedure to deploy a suture 600, so that a loop or coil of the suture is tightened or constricted around a tendon. FIG. 11A shows an assembled view of the system 500 in operative association with the suture 600, and FIG. 11B shows an unassembled or exploded view of the system 500 along with a suture 600. In use, the proximal portion of the system is disposed external to the patient, and the distal portion of the system is disposed internal to the patient (e.g. providing access to a joint space JS within the patient, through the patient skin S). Arthroscopic system 500 includes a release spring cap 510, a port sleeve 520, a lever 530, a lever spring 540, a lever pin 550, a release spring 560, a port 570, and a suture cap 580. In some cases, port 570 can include external threads or spiral engagement features 573 which can help facilitate the insertion of port 570 into a patient. In some cases, the port sleeve 520 can be referred to as the inner cannula, and the port 570 can be referred to as the outer cannula. FIG. 11C shows a cross-section assembled view of the system 500 in operative association with the suture 600. As shown in FIG. 11D, operation of the arthroscopic system can involve inserting the port sleeve 520 and the release spring 560 into a distal section 572 of the port or port cannula 570, as indicated by arrow A. Once the port sleeve 520 and the release spring 560 have been inserted into the port 570, a release lever of the distal section 572 of the port 570 can be released, so as to lock the port sleeve 520 and the release spring 560 in the port 570, as shown in FIGS. 11E and 11F. Specifically, as shown in FIG. 11E (top view) the lever 530 is in the open position, and as shown in FIG. 11F (side cross-section view) the release spring 560 is uncompressed. The untied suture can then be placed through the cannula or inner aperture or channel of the port sleeve 520. Thereafter, as shown in FIG. 11G (top view) the lever 530 can be placed in the closed position, and as shown in FIG. 11F (side cross-section view) the release spring 560 can become compressed. In this way, it is possible to advance the port sleeve 520 distally relative to the port 570, thus compressing the release spring 560, and then lock the lever 530 in the closed position so as to fix the port sleeve 520 relative to the port 570.

FIG. 11I shows how the suture 600 can be placed through the system 500, and FIG. 11J shows how a distal portion 610 of the suture 600 can be wrapped around a distal portion 522 of the port sleeve, so as to form a coil 620 that surrounds or is circumferentially positioned about the distal portion 522. FIG. 11I can represent the suture in an untied state, and FIG. 11J can represent the suture in a tied or partially tied state (e.g. nail knot). The suture shown in FIG. 11J can be provided as a nail knot cinch, in some embodiments.

FIGS. 11K and 11L show how the release spring cap 510 can be positioned at a proximal portion of the system 500 and how the suture cap 580 can be placed over the suture coil 620, such that the suture coil 200 is then positioned between the suture cap 580 and the distal portion 522 of the port sleeve. In some cases, the configuration shown in FIG. 11L can be provided as a pre-packaged or prepared product, ready for use by a surgeon.

As shown in FIG. 11M, an end portion of a tendon 700 can be placed within a distal section 590 of the system 500. Relatedly, as shown in the side cross-section view of FIG. 11N, an end portion 710 of the tendon 700 can be positioned within the port 570 (e.g. at a distal section of the port) such that the end portion 710 is surrounded by the port 570, the port sleeve 520, the suture cap 580, and the coil 620. The end portion 710 of the tendon can be placed or positioned within the port 570 using any of a variety of techniques or mechanisms. For example, the tendon may be advanced within the port using a pusher mechanism, or drawn into the port using a puller mechanism. In some cases, a grasper mechanism may be used to place the tendon in the port. In some cases, a thread (e.g. pull thread) attached or coupled with the tendon can be used to pull the tendon into the port.

As shown in FIGS. 11O and 11P, once the tendon is positioned within the port 570 as desired, the lever 530 can be released, thus allowing the release spring 540 to decompress and the port sleeve 520 to advance proximally as indicated by arrow A (as the port sleeve 520 is pushed or forced proximally by the expanding release spring 560), such that a distal section of the port sleeve 520 is no longer positioned between the suture coil 620 and the end portion 710 of the tendon 700.

As illustrated in FIG. 11Q, the coil 620 (which may also be a knot such as a nail knot) can be compressed or constricted about the end portion of the tendon. This compression or constriction action can be accomplished or facilitated by pulling a proximal portion 630 of the suture in a distal direction as indicated by arrow A and/or by pulling a distal portion 610 of the suture in a distal direction as indicated by arrow B. In some cases, pulling the distal portion 610 of the suture in a proximal direction is sufficient to collapse the coil 620 about the tendon 700 thus gaining sufficient purchase or friction to secure and tighten the knot (e.g. in a self-tightening technique). As illustrated in FIG. 11R, once the coil 620 or knot has engaged the tendon, the tendon can be advanced proximally relative to the system 500, as indicated by arrow C. For example, the tendon 700 may be pulled and/or pushed out of the system 500.

Figure 11S:
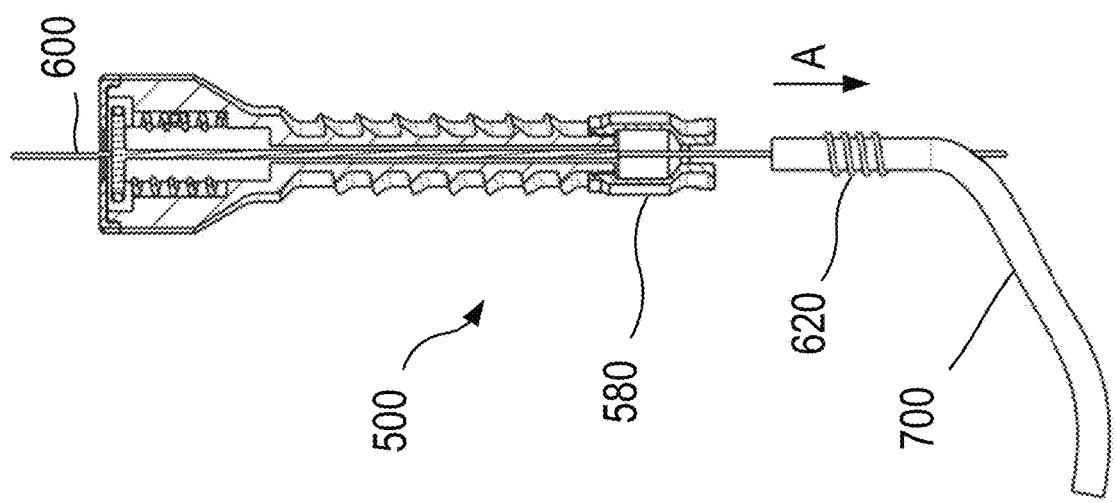

As shown in FIG. 11S, the tendon 700 can be pushed, pulled, retracted, advanced, or otherwise moved out of the system 500, for example in the direction indicated by arrow A. Any of a variety of threads, graspers, pushers, and the like can be used to move the tendon in this way. FIG. 11T depicts the suture 600 knotted onto the tendon 700. Although coil or knot 620 is often described herein at a nail knot, some embodiments of the present invention also encompass the use of other types of knots, such as friction knots, which can be used to join a suture with a tendon. With reference to FIG. 11T, it is understood that the free end 601 of the suture can be attached to the body of the patient in various ways, for example by inserting it into a tunnel bore in a bone and anchoring it thereto. In some cases, the free end 601 could be secured by an interference screw, to hold the free end 601 with the bone. In some cases, a suture anchor could be used to secure the free end 601 with the bone. In some cases, the free end of the suture can include or be coupled with a bone anchor, a soft tissue anchor, or the like. Methods can also involve trimming excess suture portions (e.g. proximal portion of suture and/or distal portion of suture).

FIGS. 12A to 12C illustrate how the lever locking mechanism 505 can be used to lock the position of the port sleeve 520 relative to the port 570. With reference to FIGS. 12A and 12B, when the lever 530 is in the locked position, the lever spring 540 is less compressed (or uncompressed) and the lever stop 535 operates to hold the port sleeve 520 in place, relative to the port 570. For example, lever stop 535 can prevent port sleeve 520 from moving in the direction indicated by arrow A (e.g. as a result of the expansion of release spring 560). Toward this end, port 570 may include an aperture 574 configured to receive the lever stop 535. FIG. 12A provides a top view and FIG. 12B provides a side cross-section view. With reference to FIG. 12C, which provides a top view, the lever 530 can be changed to the unlocked position, where the lever spring 540 is more compressed (or compressed) and the lever stop 535 no longer holds the port sleeve in place relative to the port 570. Lever 530 can pivot about lever pin 550. As shown in FIG. 12D, port 570 can include pin holes 571 configured to receive the lever pin. Embodiments of the present invention encompass any of a variety of locking mechanisms which can be used to reversibly lock the position of the port sleeve 520 relative to the port 570.

Embodiments of the present invention are well suited for use in any of a variety of surgical procedures. For example, embodiments may be used in a bicep tenodesis procedure, where a surgeon releases a torn bicep tendon the labrum, and relocates the bicep tendon to the humerus. Embodiments also encompass the placement of nail knot sutures on hamstring tendons (either autograft or allograft) during knee reconstruction surgeries including anterior cruciate ligament (ACL), posterior cruciate ligament (PCL), lateral collateral ligament (LCL), and medial collateral ligament (MCL) procedures. Embodiments also encompass the placement of nail knot sutures on other allograft tendons used in knee, shoulder, elbow, hand, wrist, foot, or other joint reconstruction, including without limitation Flexor Hallucis or other tendons during foot reconstruction. In some cases, embodiments can be used on allograft tissues, including without limitation, tendons and ligaments, for reconstruction procedures. In some cases, embodiments can be used for tendon repair. In some cases, embodiments can be used for ligament repair. In some cases, embodiments can be used for fibrous connective tissue repair. In some cases, embodiments may be used with multiple tendons and/or ligaments for reconstruction, including various types of procedures such as allograft tissue grafts and autograft tissue grafts. Any of the procedures disclosed herein can be amenable to having a nail knot placed for the purpose of providing a secure fixation to aid in reconstruction. Other embodiments encompass proximal and distal biceps procedures, hamstrings procedures, as well as procedures involving flexor and/or extensor tendons and/or ligaments about the hand, wrist, and/or foot. Exemplary embodiments also encompass systems and methods for the application of one or more knots in knee procedures (e.g. ACL, PCL, LCL, MCL), as well as lateral collateral ligament (LCL) and medial collateral ligament (MCL) elbow procedures. Further, exemplary embodiments also encompass systems and methods for the application of one or more knots in tendon procedures which can involve an Achilles tendon, a bicep tendon, a finger tendon, or a patellar tendon.

Embodiments of the present invention may be used in arthroscopic procedures as well as open surgery procedures.

Although the preceding description contains significant detail in relation to certain preferred embodiments, it should not be construed as limiting the scope of the invention but rather as providing illustrations of the preferred embodiments.

Embodiments of the present invention encompass kits having suture knot tools and sutures as disclosed herein. In some embodiments, the kit includes one or more suture knot tools, sutures, or suture knot tools pre-loaded with sutures, along with instructions for using the device(s) for example according to any of the methods disclosed herein.

All features of the described systems and devices are applicable to the described methods mutatis mutandis, and vice versa.

Although the foregoing invention has been described in some detail by way of illustration and example for purposes of clarity of understanding, one of skill in the art will appreciate that certain changes, modifications, alternate constructions, and/or equivalents may be practiced or employed as desired, and within the scope of the appended claims. In addition, each reference provided herein in incorporated by reference in its entirety to the same extent as if each reference were individually incorporated by reference. Relatedly, all publications, patents, patent applications, journal articles, books, technical references, and the like mentioned in this specification are herein incorporated by reference to the same extent as if each individual publication, patent, patent application, journal article, book, technical reference, or the like was specifically and individually indicated to be incorporated by reference.

What is claimed is:

1. A method of forming a nail knot between a suture and a fibrous connective tissue of a patient during an arthroscopic procedure, the method comprising:
   drawing a free end portion of the fibrous connective tissue into a port sleeve of an arthroscopic system so that the free end portion of the fibrous connective tissue is disposed within the port sleeve, wherein a nail knot cinch of the suture is disposed external to the port sleeve;
   moving the port sleeve relative to the free end portion of the fibrous connective tissue and the nail knot cinch of the suture, to allow the nail knot cinch of the suture to contact the free end portion of the fibrous connective tissue; and
   tightening the nail knot cinch of the suture about the free end portion of the fibrous connective tissue, so as to form the nail knot with the suture and the fibrous connective tissue.

2. The method according to claim 1, wherein the step of tightening the nail knot cinch of the suture about the free end portion of the fibrous connective tissue comprises pulling a proximal portion of the nail knot cinch in a proximal direction relative to a central loop of the nail knot cinch.

3. The method according to claim 2, wherein the step of tightening the nail knot cinch of the suture about the free end portion of the fibrous connective tissue further comprises pulling a distal portion of the nail knot cinch in a distal direction relative to a central loop of the nail knot cinch.

4. The method according to claim 1, wherein the port sleeve is disposed at least partially within a joint space of the patient.

5. The method according to claim 1, wherein at least a portion of the port sleeve is disposed within a port and a suture cap is disposed about the nail knot cinch, when the port sleeve is moved relative to the free end portion of the fibrous connective tissue and the nail knot cinch of the suture.

6. The method according to claim 1, wherein the fibrous connective tissue is a diseased fibrous connective tissue or a damaged fibrous connective tissue.

7. The method according to claim 1, wherein the fibrous connective tissue comprises a member selected from the group consisting of a tendon and a ligament.

8. The method according to claim 1, wherein the fibrous connective tissue comprises a tendon.

9. The method according to claim 1, wherein the fibrous connective tissue comprises a ligament.

* * * * *